(12) United States Patent
Ryu

(10) Patent No.: US 11,173,406 B2
(45) Date of Patent: Nov. 16, 2021

(54) COMPUTER-READABLE NON-TRANSITORY STORAGE MEDIUM HAVING GAME PROGRAM STORED THEREIN, GAME SYSTEM, GAME APPARATUS, AND GAME PROCESSING METHOD

(71) Applicant: NINTENDO CO., LTD., Kyoto (JP)

(72) Inventor: Michi Ryu, Yokohama (JP)

(73) Assignee: NINTENDO CO., LTD., Kyoto (JP)

( * ) Notice: Subject to any disclaimer, the term of this patent is extended or adjusted under 35 U.S.C. 154(b) by 25 days.

(21) Appl. No.: 16/727,137

(22) Filed: Dec. 26, 2019

(65) Prior Publication Data

US 2020/0376391 A1    Dec. 3, 2020

(30) Foreign Application Priority Data

May 31, 2019  (JP) .............................. JP2019-103014

(51) Int. Cl.
*A63F 13/822* (2014.01)
*A63F 13/57* (2014.01)
*A63F 13/58* (2014.01)

(52) U.S. Cl.
CPC ............ *A63F 13/822* (2014.09); *A63F 13/57* (2014.09); *A63F 13/58* (2014.09)

(58) Field of Classification Search
None
See application file for complete search history.

(56) References Cited

U.S. PATENT DOCUMENTS

| 2004/0143852 | A1* | 7/2004 | Meyers | A63F 13/12 725/133 |
| 2011/0102459 | A1* | 5/2011 | Hall | H04W 4/021 345/633 |
| 2017/0151502 | A1 | 6/2017 | Yasuda | |

FOREIGN PATENT DOCUMENTS

| JP | 2015-077430 A | 4/2015 |
| JP | 2017-093978 A | 6/2017 |

OTHER PUBLICATIONS

"Game Map," Jul. 3, 2008, https://web.archive.org/web/20080703160854/http://begm.sourceforge.net/help/widget_gamemap.html (Year: 2008).*
"NieR:Automata", Aug. 16, 2017, 4gamer.net, https://web.archive.org/web/20170816074405/http://www.4gamer.net:80/games/306/G030635/20170224145, Search on Nov. 10, 2020.
"Romantic SaGa 2, Virtual Console", Jun. 3, 2015, https://web.archive.org/web/20150603215913/http://www.nintendo.co.jp/wii/vc/vc_rs2/vc_rs2_08.html, Search on Nov. 10, 2020.

(Continued)

*Primary Examiner* — Kevin Y Kim
(74) *Attorney, Agent, or Firm* — Scully, Scott, Murphy & Presser, P.C.

(57) ABSTRACT

At least one unit region on a virtual field is set as a special region associated with a special effect, based on setting data received via a network. Furthermore, movement and fighting of a player character are controlled, and, when the player character reaches the special region, the special effect is exhibited. Information of the unit region in which an event has occurred in a game is transmitted via the network. The special region is set (1) based on the frequency with which the event occurs for each unit region, or (2) based on the setting data which represents the special region and is defined based on the information of the unit region.

27 Claims, 21 Drawing Sheets

(56) References Cited

OTHER PUBLICATIONS

Hiroyuki, Y., "3D Software Manual", Sony Computer Entertainment, Aug. 19, 2010, pp. 1-10.
"Yuusha no kuseni namaikida or 2", Harkan Fugi, Inc., Oct. 31, 2008, pp. 1-7, vol. 23, No. 44.
Hiroyuki, Y., "Yuusha no kuseni namaikida or 2 Software Manual", Sony Computer Entertainment, Oct. 14, 2008, pp. 1-3.
"Yuusha no kuseni namaikida or 2," Telecommunication PlayStation, ASCII Media Works, Nov. 28, 2008, vol. 14, No. 44.
Notice of Reasons for Refusal dated Nov. 24, 2020 received in Japanese Patent Application No. JP 2019-103014 together with an English language translation.
Nintendo Co., Ltd., "Fire Emblem Awakening", [online], https://www.nintendo.com/games/detail/fire-emblem-awakening-3ds/, printed Oct. 9, 2019.

* cited by examiner

| ROUTE ID | CHAPTER ID | DEFEAT-NUMBER INFORMATION | BEING-DEFEATED-NUMBER INFORMATION |
|---|---|---|---|
| 001 | 001 | .... | .... |
| 001 | 002 | .... | .... |
| 001 | 003 | .... | .... |
| 002 | 001 | .... | .... |

F I G. 7

413

| x<br>y | 1 | 2 | 3 | 4 | 5 | 6 | ... | 32 |
|---|---|---|---|---|---|---|---|---|
| 1 | 0 | 32 | 93 | 46 | 120 | 2310 | ... | 0 |
| 2 | 70 | 39 | 641 | 98 | 337 | 624 | ... | 107 |
| 3 | 21 | 410 | 102 | 1690 | 41368 | 9240 | ... | 120 |
| 4 | 10 | 1387 | 2867 | 1200 | 48074 | 24130 | ... | 600 |
| 5 | 163 | 200 | 7910 | 9600 | 13542 | 19310 | ... | 150 |
| 6 | 20 | 1230 | 17560 | 4893 | 8614 | 31602 | ... | 43 |
| ⋮ | ... | ... | ... | ... | ... | ... | ... | 0 |
| 32 | 0 | 0 | 0 | 0 | 0 | 0 | ... | 0 |

503

| ROUTE ID | CHAPTER ID | MAP STRUCTURE INFORMATION |
|---|---|---|
| 001 | 001 | .... |
| 001 | 002 | .... |
| 001 | 003 | .... |
| 002 | 001 | .... |
| ⋮ | ⋮ | ⋮ |

505

| COORDINATE INFORMATION 541 | TOPOGRAPHY INFORMATION 542 | BONUS CELL INFORMATION 543 | OTHER INFORMATION 544 |
|---|---|---|---|
| (1, 1) | FOREST | ... | ... |
| (2, 1) | FOREST | ... | ... |
| (3, 1) | PLAIN | ... | ... |
| ⋮ | | ⋮ | ⋮ |
| (32, 32) | ROAD | ... | ... |

543

EFFECTIVENESS FLAG — 5431
CLASSIFICATION INFORMATION — 5432
EFFECT CONTENT — 5433

F I G. 1 3

506

| UNIT ID | EXISTENCE FLAG | HOSTILE SIDE/ PLAYER'S SIDE INFORMATION | CLASS INFORMATION | HP/MP INFORMATION | POSITION INFORMATION |
|---|---|---|---|---|---|
| 001 | EXIST | PLAYER'S SIDE | SWORDSMAN | 36/12 | (2,31) |
| 002 | EXIST | PLAYER'S SIDE | SWORDSMAN | 36/12 | (14,21) |
| 003 | EXIST | HOSTILE SIDE | GENERAL | 80/20 | (32,15) |
| 004 | FLEE | HOSTILE SIDE | KNIGHT | 0/10 | (17,28) |
| ⋮ | ⋮ | ⋮ | ⋮ | ⋮ | ⋮ |
| nnn | EXIST | HOSTILE SIDE | PRIEST | 36/12 | (26,16) |

| y \ x | 1 | 2 | 3 | 4 | 5 | 6 | ... | 32 |
|---|---|---|---|---|---|---|---|---|
| 1 | 0 | 0 | 0 | 0 | 0 | 0 | ... | 0 |
| 2 | 0 | 0 | 0 | 0 | 0 | 0 | ... | 0 |
| 3 | 0 | 0 | 0 | 0 | 0 | 0 | ... | 0 |
| 4 | 0 | 0 | 0 | 0 | 0 | 0 | ... | 0 |
| 5 | 0 | 0 | 0 | 0 | 0 | 0 | ... | 0 |
| 6 | 0 | 0 | 0 | 0 | 0 | 0 | ... | 0 |
| ⋮ | ... | ... | ... | ... | ... | ... | ... | 0 |
| 32 | 0 | 0 | 0 | 0 | 0 | 0 | ... | 0 |

COMPUTER-READABLE NON-TRANSITORY STORAGE MEDIUM HAVING GAME PROGRAM STORED THEREIN, GAME SYSTEM, GAME APPARATUS, AND GAME PROCESSING METHOD

CROSS REFERENCE TO RELATED APPLICATION

The disclosure of Japanese Patent Application No. 2019-103014, filed on May 31, 2019, is incorporated herein by reference.

FIELD

The exemplary embodiment relates to game processing using a virtual field which is divided into a plurality of unit regions.

BACKGROUND AND SUMMARY

To date, a game in a genre called a simulation role playing game has been known. In such a game, a player moves, on a map which is divided into quadrangular cells so as to be grid-shaped, a player's side army character along the cells and causes the player's side army character to fight with a hostile army character and the like, thereby aiming at achievement of victory conditions.

In such a game, a predetermined cell on the map may be set as a "bonus cell". The bonus cell is a cell at which a special effect such as an effect of obtaining a predetermined item or obtaining an empirical value can be obtained when the player's side army character has moved to the cell.

In a conventional simulation role playing game, the position (cell) at which the above-described bonus cell is set is fixed. Regarding this point, there is room for enhancing the interactivity of a game processing which in turn enhances game entertainment.

Therefore, it is a feature of the exemplary embodiment to provide a game program, a game system, a game apparatus, and a game processing method which can dynamically change a position of an arrangement element such as a bonus cell disposed on a map, according to the tendency of actual play results of a user.

In order to attain the feature described above, the following configuration examples are exemplified.

One aspect of the exemplary embodiment provides a computer-readable non-transitory storage medium having a game program stored therein, and the game program causes a computer of an information processing apparatus to execute the following processes. Firstly, setting data is received via a network. At least one unit region defined based on the setting data having been received is set, in a virtual field which is disposed in a virtual space and divided in a plurality of unit regions, as a special region associated with a special effect. Causing an image of the virtual space to be displayed. Game processing including at least a process of controlling movement of at least one player character in the image of the virtual space by using each unit region as a movement unit, based on an operation performed by a player, updating the virtual field in the virtual space, causing the player character to fight with a hostile character disposed in the virtual field, and exhibiting the special effect associated with the special region when the player character reaches the special region, is performed. Event occurrence information that includes information of the unit region in which an event has occurred in the game processing is generated, and the event occurrence information is transmitted via the network at defined times. (1) The special region is set based on a frequency with which the event occurs for each unit region, from the setting data which is generated according to the event occurrence information transmitted from a plurality of the information processing apparatuses and which includes statistical data that is data about the number of times the event occurs. Alternatively, (2) the special region is set based on the setting data which indicates the special region defined according to the statistical data that is data about the number of times the event occurs, where the number of times is based on event occurrence information of a plurality of information processing apparatuses. In the description herein, examples of the computer-readable non-transitory storage medium include a magnetic medium such as a flash memory, a ROM, and a RAM, and an optical medium such as a CD-ROM, a DVD-ROM, and a DVD-RAM.

In the above-described configuration, the unit region disposed at a predetermined position can be set as the special region according to actual play results from multiple players including the user. Thus, the position of the special region can be dynamically changed, and the adjustment can be automatically performed for an appropriate game balance.

In another exemplary embodiment, the event occurrence information may include information of a position of the unit region in which the player character has been disposed at occurrence of a being-defeated event in which the player character is defeated in the fight. The unit region in which the being-defeated event occurs with high frequency may be set as the special region.

In the above-described configuration, the unit region in which the being-defeated event such as an event in which the player character is defeated in the fight occurs can be set as the special region. Thus, the unit region in which the incidence of the being-defeated event is high can be presented as the special region to the player.

In another exemplary embodiment, the game processing may further include a return process of returning, according to an instruction from the player, a state of the virtual field that includes the player character and the hostile character, to a state at a time before the instruction. The event occurrence information may include information of a position of the unit region in which the being-defeated event occurs in a returned state, also when the return process has been performed.

In the above-described configuration, even when the process is returned while the game progresses, information of the being-defeated event that occurs in the returned state can be transmitted. This facilitates collection of data about occurrence of the being-defeated event.

In another exemplary embodiment, the game processing may include a process of consuming a parameter for fighting capability of the player character in the fight with the hostile character. The special effect may include an effect of restoring the parameter, for the fighting capability, of the player character that has reached the special region when the parameter has been consumed.

In the above-described configuration, an effect of restoring a parameter can be exhibited at a position where the being-defeated event of the player character being defeated is likely to occur. Thus, the player character can be prevented from being in a disadvantageous situation. Furthermore, a situation in which the player character goes through a dangerous scene at the last moment can be expected to be rendered, thereby enhancing game entertainment characteristics.

In another exemplary embodiment, the event occurrence information may include information of the unit region in which the hostile character has been disposed at occurrence of a defeat event in which a hostile character is defeated in the fight.

In the above-described configuration, the unit region where the defeat event in which the hostile character is defeated occurs, such as the unit region in which player character has won the fight, can be set as the special region. Thus, the unit region in which the incidence of the defeat event is high can be presented as the special region to the player.

In another exemplary embodiment, the special effect may include an effect of obtaining an item.

In the above-described configuration, in the case of the unit region in which the incidence of the defeat event is high, an item can be obtained after defeating the hostile character as a result of the fight. Furthermore, in the case of the unit region in which the incidence of the being-defeated event is high, the game can be rendered such that the player character moves in order to aim at an item, and, as a result, the player character is likely to be defeated by the hostile character, thereby enhancing the game entertainment characteristics.

In another exemplary embodiment, the game processing may be performed until a clearing condition is satisfied in the virtual field corresponding to a scene based on game progress. The setting data associated with the scene and the virtual field may be received when the game processing according to at least the scene is started. The defined times includes when the clearing condition is satisfied.

In the above-described configuration, at least when game processing is started, the setting data is received. Therefore, information of the events that occur before the clearing condition is satisfied after reception of the setting data can be collectively transmitted at one time, thereby reducing the number of times of communication which improves communication efficiency.

In another exemplary embodiment, the setting data may include data representing the number of times the event has occurred for each unit region. The event occurrence information may include data representing the number of times obtained by adding the number of times of occurrence of the event for each unit region in the game processing to the number of times, of occurrence of the event for each unit region, which is included in the setting data obtained when the setting data is received.

In the above-described configuration, the number of times of occurrence of the event generated by the player is added to data, associated with the number of times of occurrence, which is included in the received setting data, and the resultant data can be transmitted. Thus, the aggregating process on the data receiver side (for example, the server) is unnecessary.

In another exemplary embodiment, when the number of times of occurrence of the event for each unit region exceeds a predetermined value, the number of times, of occurrence of the event in the unit region, which is included in the event occurrence information may be reset. The defined times includes when the event occurrence information is reset.

In the above-described configuration, the position of the special region is prevented from being fixed to the position at which the frequency of occurrence is highest, and a position at which the frequency of occurrence is different can be selected. Thus, the position of the special region can be varied. Therefore, in a case where the game processing using the same virtual field is played at different start times, interactiveness may be improved.

According to the exemplary embodiment, a special effect can be set in a unit region disposed at a position according to actual play results from multiple players including a user. Thus, a game balance can be automatically adjusted in an appropriate manner, thereby enhancing interactivity.

BRIEF DESCRIPTION OF THE DRAWINGS

FIG. 7 illustrates a non-limiting example of a data structure of defeat-number information 413;

FIG. 13 illustrates a non-limiting example of a data structure of a unit list 506;

FIG. 14 illustrates a non-limiting example of a data structure of defeat-number count data 507;

DETAILED DESCRIPTION OF NON-LIMITING EXAMPLE EMBODIMENTS

Figure 1:
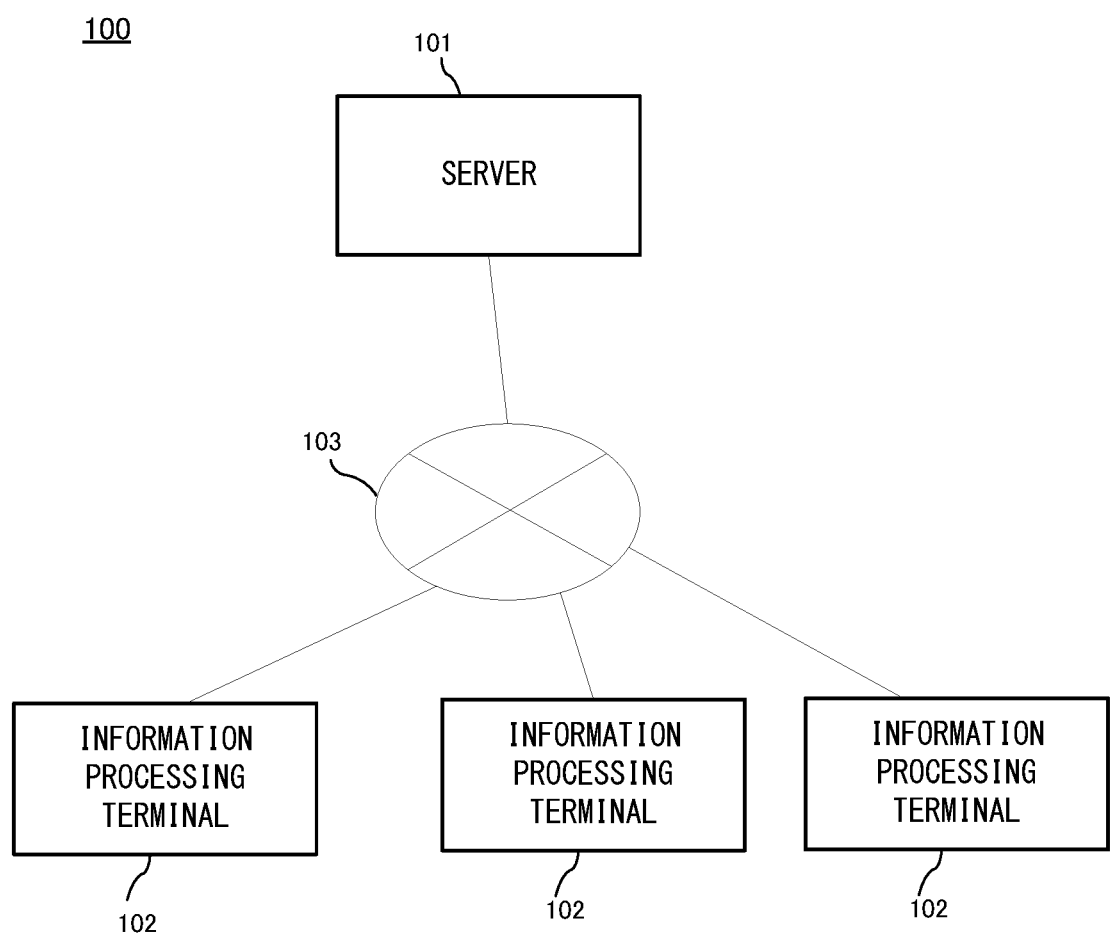
FIG. 1 is a schematic diagram illustrating a non-limiting example of the entire structure of an information processing system according to an exemplary embodiment.

Hereinafter, one exemplary embodiment will be described. It is to be understood that, as used herein, elements and the like written in a singular form with a word "a" or "an" attached before them do not exclude those in the plural form. FIG. 1 is a schematic diagram illustrating a non-limiting example of the entire configuration of an information processing system according to the present embodiment. An information processing system 100 of the present embodiment includes a server 101 and a plurality of information processing terminals 102. The server 101 and each information processing terminal 102 are configured to be able to communicate with each other via the Internet 103. In the present embodiment, with such a configuration, information processing is executed. Hereinafter, a description will be given with game processing as an example of the information processing. Specifically, game processing for which a game program is installed on the information processing terminal 102 and which is executed while communication with the server 101 is being performed as necessary, will be described as an example.

[Hardware Configuration of Server]

Figure 2:
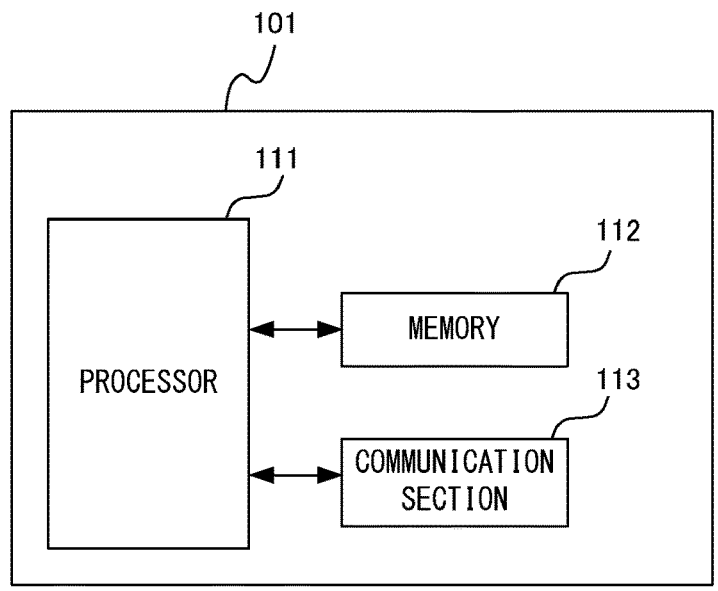
FIG. 2 is a block diagram illustrating a non-limiting example of a hardware configuration of a server 101.

Next, the hardware configuration of the server 101 will be described. FIG. 2 is a block diagram illustrating a non-limiting example of a hardware configuration of the server 101. The server 101 includes at least a processor 111, a memory 112, and a communication section 113. The processor 111 executes various programs for controlling the server 101. In the memory 112, various programs to be executed by the processor 111 and various kinds of data to be used by the processor 111 are stored. The communication section 113 connects to a network by means of wired or wireless communication and transmits/receives predetermined data to/from each information processing terminal 102 or another server (not shown).

[Hardware Configuration of Information Processing Terminal]

Figure 3:
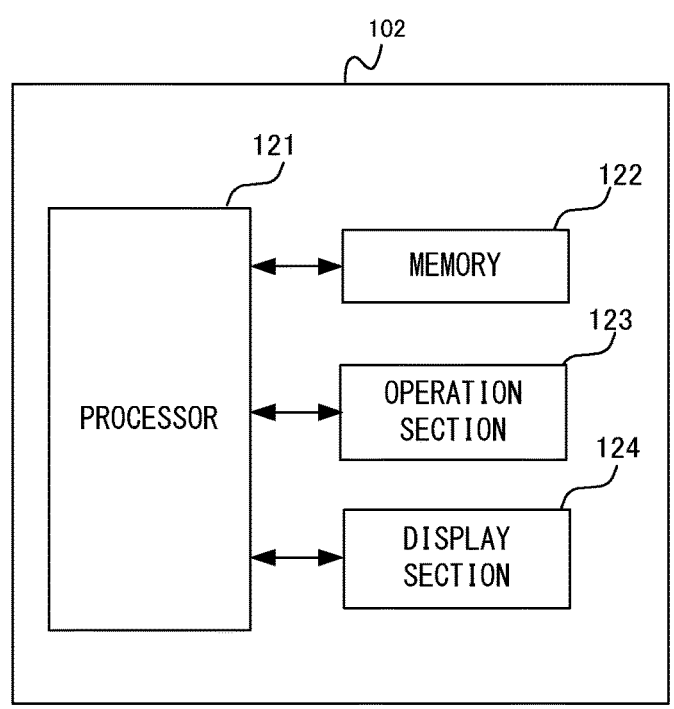
FIG. 3 is a block diagram illustrating a non-limiting example of a hardware configuration of an information processing terminal 102.

FIG. 3 is a block diagram illustrating a non-limiting example of a hardware configuration of the information processing terminal 102 in which game processing according to the present embodiment is executed. Here, in the present embodiment, for example, a smart device such as a smartphone and a tablet-type information processing apparatus, a game apparatus such as a stationary game apparatus and a hand-held game apparatus, a personal computer, or the like is assumed as the information processing terminal 102.

In FIG. 3, the information processing terminal 102 includes a processor 121, a memory 122, an operation section 123, and a display section 124. The processor 121 executes later-described game processing or executes a system program (not shown) for controlling overall operation of the information processing terminal 102, thereby controlling operation of the information processing terminal 102. The processor 121 may include a single processor or a plurality of processors. In the memory 122, various programs to be executed by the processor 121 and various kinds of data to be used in the programs are stored. The memory 122 is, for example, a flash EEPROM or a hard disk device. The operation section 123 is an input device for receiving an operation from a user, and is implemented by, for example, various pointing devices, various press-type buttons, an analog stick, a touch panel, or the like. The display section 124 is a screen for outputting a game image generated as a result of the information processing, and is, for example, a liquid crystal display device. In the present embodiment, an exemplary case where the information processing terminal 102 has the display section 124, will be described. However, in another exemplary embodiment, a game image may be output to an external display unit (for example, a television).

The information processing terminal 102 also includes a communication section (not shown) for communication with the server 101.

[Outline of Game Processing According to the Present Embodiment]

Next, the outline of game processing executed in the present embodiment will be described. A game to be executed in the present embodiment is a turn-based strategy type simulation game (hereinafter, referred to as TBSG). In the present embodiment, a TBSG in which the total of two armies of one player's side army and one hostile army fight with each other, is assumed to be executed. In this TBSG, a game piece in the simulation game is referred to as "unit". Furthermore, a player's side unit is referred to as "player's side army unit" and a unit of a hostile army is referred to as "hostile army unit". In the present embodiment, a human character is assumed as each unit, and at least parameters about fighting capability are set for each unit. The parameters about the fighting capability are, for example, various kinds of parameters which can be used when a unit fights with another unit, and include HP (hit point as a life parameter), MP (magic point), attacking power, the number of times a weapon is used, the number of times a special skill is used, and the like. The hostile army unit can be defeated if the HP of a hostile army unit is made 0 by a fight between the units. Meanwhile, a player's side army unit may be defeated by a hostile army unit. In the present embodiment, a state in which a unit defeats another unit/is defeated by another unit is referred to as "defeat". In the present embodiment, the "defeat" represents a state where, since the life parameter such as HP of the unit is made 0, the unit does not exist on a play map. In another exemplary embodiment, "defeat" may represent a state where a unit cannot do any subsequent actions although the unit exists on the play map.

In the TBSG according to the present embodiment, a play map corresponding to a scene based on game progress is previously defined. Specifically, in this TBSG, the game progresses according to a story. The story includes storylines that diverge during the game, and a player is allowed to enjoy various story developments by playing the game multiple times. Each story development is called "route" in the present embodiment. Each route is constituted by units each called "chapter". A "play map" that is a virtual field for playing the TBSG by using each unit is prepared for each chapter. That is, in the present embodiment, a play map based on a scene which can be specified by the route and the chapter is previously defined.

In the present embodiment, a collection of "cells" each of which is a quadrangular (square) region constitutes the play map (arranged so as to be grid-shaped). In the present embodiment, one cell is a minimum moving unit of each unit. That is, the cell may be a unit region for movement of each unit. In the present embodiment, the size of the play map is up to 32×32 cells, and the size is previously defined according to each chapter. This quadrangular shape of the cell is an example. In another exemplary embodiment, the cell may have a hexagonal or a triangular shape, or may have a variable shape. The cells may not be arranged so as to be grid-shaped as in the present embodiment, and the cells may be discretely arranged as in, for example, a board game such as a Japanese game called "sugoroku".

[Example of Screen]

Figure 4:
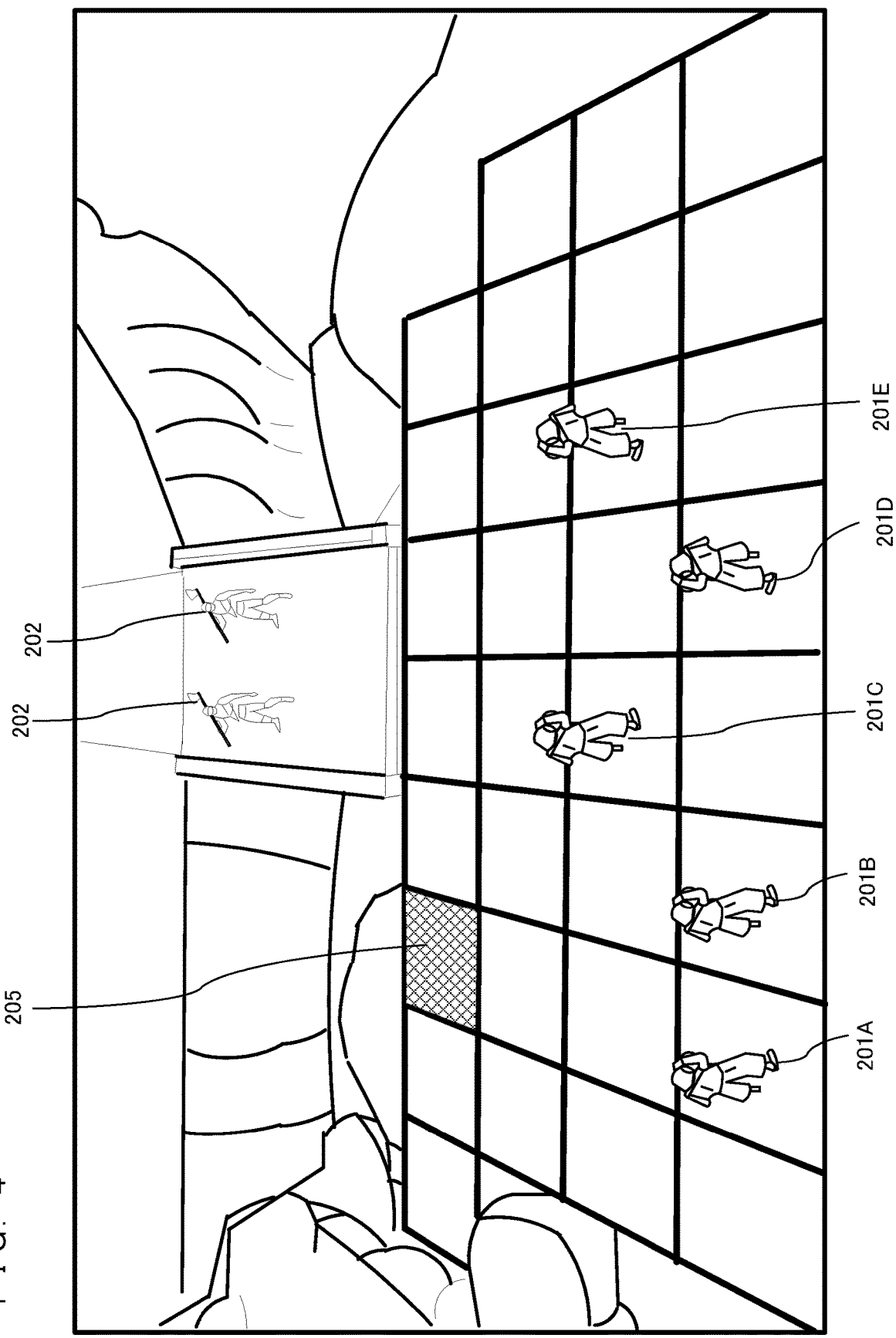
FIG. 4 illustrates a non-limiting example of a game screen.

FIG. 4 illustrates a non-limiting example of a screen for the TBSG according to the present embodiment. The exemplary screen represents a game screen obtained by taking an image of a play map (corresponding to the ground and topography in a virtual game space) and a three-dimensional virtual game space in which each unit is disposed, by a virtual camera, at a predetermined position behind a player's side army unit 201. A position, an angle, an angle of view, or the like of the virtual camera can be optionally changed according to an operation by a player. In FIG. 4, a total of five player's side army units 201 which are player's side army units 201A to 201E (hereinafter, may be collectively called player's side army unit 201) are disposed on the cells of the play map (ground portion). Furthermore, two hostile army units 202 are disposed on the cells (positions on a bridge) on the screen depth side relative to the player's side army unit 201. FIG. 4 shows an example where it is turn of the player's side army, and the player's side army unit 201C is an object to be currently operated. Therefore, a range where the player's side army unit 201C is movable is distinctly displayed by the cells (when the movement-allowed range need not be displayed in the game, a boundary line between the cells may be displayed or may not be displayed).

In the TBSG according to the present embodiment, some "bonus cells" are set on the play map. The bonus cell is a cell at which a predetermined effect that is advantageous for the player's side army (player) can be obtained when the player's side army unit 201 reaches the cell. In the present embodiment, when the player's side army unit 201 "ends an action (the unit ends an action in the turn)" on a predetermined cell, it is determined that the cell is reached. The predetermined effect represents, for example, an effect of obtaining a predetermined item, an effect of restoring various status values of the player's side army unit 201, and an effect of improving various status values. In the example shown in FIG. 4, a cell 205 on around the center on the left side of the screen is set as the bonus cell as described above. A visual effect for allowing a player to visually recognize the bonus cell is set. For example, a display mode is changed from a display mode for another cell. In the exemplary screen, for example, an effect of the bonus cell being displayed so as to have a mesh-like pattern is used as the visual effect. In the present embodiment, the effect is exhibited in the bonus cell only one time. After the effect has been exhibited, the above-described visual effect is canceled.

Outline of Features of the Present Embodiment

In the present embodiment, as described above, the information processing terminal 102 can communicate with the server 101 via a network. Therefore, the information processing terminal 102 communicates with the server 101 before start of the play map or at time when the play map is cleared, and can obtain predetermined data from the server 101 or transmit predetermined data to the server 101. In the present embodiment, the network function is used to set a position of the bonus cell described above according to information based on a play result of each player. The information based on the play result of a player is, for example, transmitted from the game apparatus to the server 101 when a play map is cleared. In the present embodiment, the frequency with which a predetermined event occurs is used as the information based on the play result. Specifically, the frequency of occurrence of an event of "defeating a hostile army unit" and the frequency of occurrence of an event of "the player's side army unit being defeated" are used. Therefore, in the present embodiment, information such as the defeat-number information and being-defeated-number information is used. The defeat-number information indicates how many hostile army units have been defeated and in what cells the hostile army units have been defeated on a play map which has been cleared at that time (which has been played at that time) (how many times the defeat event has occurred). In other words, the defeat-number information indicates, for each cell, the number of times the hostile army unit has been defeated. The being-defeated-number information indicates how many player's side units have been defeated and in what cells the player's side units have been defeated (how many times the being-defeated event has occurred). In other words, the being-defeated-number information indicates, for each cell, the number of times the player's side army unit has been defeated. In the present embodiment, when a TBSG game using a play map is started, the defeat-number information and the being-defeated-number information are obtained from the server 101. The position of the bonus cell described above is set based on the information (the setting method will be described below in detail).

[Outline of Process of Transmission to Server]

The outline of the process for setting the bonus cell according to the present embodiment will be described below. Firstly, a process of transmitting, to the server 101, the information based on the play result will be described. In the present embodiment, when a predetermined play map has been cleared, a process of transmitting, to the server 101, the defeat-number information and the being-defeated-number information in the play map is performed. More specifically, in the present embodiment, when the play map has been cleared, communication with the server 101 is temporarily performed, to obtain, from the server 101, the most recent defeat-number information and being-defeated-number information at that time. A process of transmitting, to the server 101, a result obtained by adding the obtained contents to the defeat number and the being-defeated number, respectively, which are counted until the play map played this time is cleared, is performed. In the server 101, a process of storing data of the defeat-number information and the being-defeated-number information which have been transmitted most recently, is performed. That is, the defeat-number information and the being-defeated-number information are updated with the most recently received contents. For example, when a player A has cleared a certain play map, the most recent defeat-number information and being-defeated-number information at that time are obtained from the server 101. For example, when the information indicates that the defeat number in a certain cell (here, referred to as a cell A for convenience sake) is "10", and the defeat number indicating the number of the hostile army units defeated by the player A in the cell A in this play is "3", "3" is added to the defeat number in the cell A in the obtained information. The defeat-number information and the being-defeated-number information are transmitted to the server 101 after the addition. The server 101 receives the information and updates the content with this information, to update the defeat number in the cell A from 10 to 13. Thereafter, when the transmission process is similarly performed by another information processing terminal 102 when the play map has been cleared, the defeat-number information indicating that the defeat number in the cell A is "13" is transmitted to said another information processing terminal 102, and the defeat number is further added to the transmitted defeat-number information.

The above-described transmission process is performed by each of the plurality of the information processing terminals 102. As a result, the defeat-number information and the being-defeated-number information for each player are transmitted to the server from each of the information processing terminals 102, and the defeat numbers and being-defeated numbers for a plurality of players can be accumulated.

In the present embodiment, an exemplary case where the most recently received defeat-number information and being-defeated-number information are stored (updated) in the server 101 in order to reduce process steps in the server 101, is described. However, in another exemplary embodiment, the server may perform aggregating and statistical process for the defeat number and the being-defeated number, based on data transmitted from each of the information processing terminals 102. The defeat number information and the being-defeated-number information obtained as a result of the process may be stored.

[Outline of Setting of Position of Bonus Cell]

Next, the outline of a process of setting a position of the above-described bonus cell will be described. An exemplary case where three bonus cells are set based on the being-defeated-number information, and ten bonus cells are set based on the defeat-number information, will be described. When a player starts to play with a certain play map, the information processing terminal 102 firstly obtains, from the server 101, the defeat-number information and the being-defeated-number information corresponding to the play map. Next, the information processing terminal 102 specifies positions of the top three cells in the order starting from the greatest being-defeated number, based on the being-defeated-number information. These cells may be cells at which the player's side army unit is likely to be defeated. Hereinafter, these cells may be referred to as "defeated cells". Furthermore, the information processing terminal 102 specifies positions of the top ten cells in the order starting from the greatest defeat-number, based on the defeat-number information. These cells may be cells at which the hostile army unit is likely to be defeated (hereinafter, these cells may be referred to as defeat cells). The information processing terminal 102 sets the specified cells as the bonus cells described above. In the following description, the bonus cell corresponding to the defeated cell is referred to as a first bonus cell, and the bonus cell corresponding to the defeat cell is referred to as a second bonus cell.

The number of the bonus cells to be set may be predetermined for each play map. For example, the number of the bonus cells to be set may be increased for a large play map, and the number of the bonus cells to be set may be reduced for a small play map. The number of the bonus cells to be set is an exemplary one, and any number may be used according to a game content.

In the present embodiment, the number of the defeated cells is set to be less than the number of defeat cells. This is because, for example, the number of times the hostile army unit appears is greater than the number of times the player's side army unit appears in each play map. However, in another exemplary embodiment, a ratio between the defeated cells and the defeat cells may be optionally set. Both the numbers may be equal to each other, or the ratio therebetween according to the present embodiment may be inverted.

Next, an effect which is set for each of the first bonus cell and the second bonus cell will be described. In the present embodiment, as the effect set for the first bonus cell, an effect of changing a status and a parameter such as restoring and increasing a status value of the player's side army unit and increasing a parameter value such as "fame value" (which rarely increases in the game), is mainly set. Meanwhile, as an effect for the second bonus cell, an effect of obtaining some item such as obtaining a predetermined item as "loot" is mainly set. In the present embodiment, as an item which can be obtained as the effect for the second bonus cell, an item which is not rare (availability difficulty level is low) is set. In consideration that the first bonus cell is basically a cell at which the player's side army unit has been defeated, and the set number of the first bonus cells is less than that of the second bonus cells, the effect obtained in the first bonus cell is set to be highly valued. Needless to say, this setting of the effect is an example, and the contents of the effect may be set as appropriate according to the game content in another exemplary embodiment.

[Reset of Counting of Bonus Cells]

Furthermore, in the present embodiment, when the defeat number in a predetermined cell becomes greater than or equal to a predetermined value, the defeat number in the cell is temporarily reset to 0. The same applies to the being-defeated number. Thus, in a case where, for example, the top ten cells having the great defeat numbers are selected and used as described above, the cells having the great defeat numbers can be prevented from being constantly selected as the top cells. As a result, the lineup of the cells included in the top ten cells can be changed, and the positions at which the bonus cells are set can be (almost compulsorily) changed.

Thus, in the present embodiment, when a play map is started, positions of the bonus cells are set based on the information about the defeat numbers and the being-defeated numbers from a plurality of players. Thus, in a case where a player plays with the same play map, when play start timing is different, the player is allowed to play with the play map in which the disposition of the bonus cells is different. The positions at which the bonus cells are disposed can be effectively and automatically changed according to the tendency of the actual play contents by the players. Disposition, of the bonus cells, which has not been expected by a developer can be automatically realized after sales of the game, thereby enhancing game entertainment interactivity.

[Details of Game Processing According to the Present Embodiment]

Next, the TBSG process according to the present embodiment will be specifically described with reference to FIG. 5 to FIG. 25.

[Data to be Used]

Figures 5, 6:
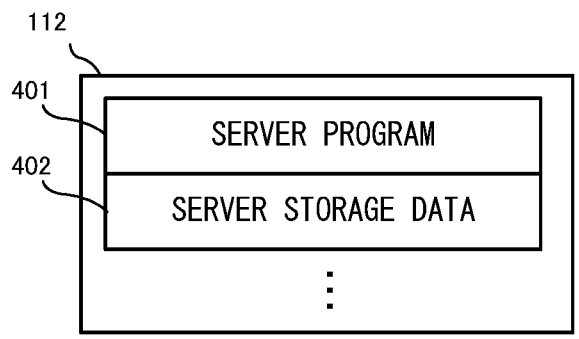
FIG. 5 illustrates a non-limiting example of data stored in a memory 112 of the server 101.
FIG. 6 illustrates a non-limiting example of a data structure of a server storage data 402.

Firstly, various data used in this TBSG process will be described. Firstly, data used in the server 101 will be described. FIG. 5 shows a non-limiting example of a memory map indicating examples of various data to be stored in the memory 112 of the server 101. A server program 401, server storage data 402, and the like are stored in the memory 112 of the server 101.

The server program 401 is a program for performing control of transmitting to and receiving from the information processing terminal 102 the server storage data 402, and storing the server storage data 402. The server storage data 402 includes information of the defeat number and the being-defeated number as described above. A data structure of the server storage data 402 will be described with reference to FIG. 6. The server storage data 402 shown in FIG. 6 is data having items of at least a route ID 411, a chapter ID 412, defeat-number information 413, and being-defeated-number information 414, in the format of a table. The route ID 411 and the chapter ID 412 are IDs for identifying the route and the chapter as described above. In other words, the route ID 411 and the chapter ID 412 are information for identifying the play map.

The defeat-number information 413 indicates the defeat number in each of the cells that constitute the play map identified by the route ID 411 and the chapter ID 412. As described above, the play map has a size of up to 32×32 cells. Therefore, the defeat-number information 413 is structured as array data corresponding to up to 32×32 cells. FIG. 7 shows an image diagram of the data structure of the defeat-number information 413. In FIG. 7, for easy understanding of the description, the defeat-number information 413 is indicated in the format of a two-dimensional table in which the horizontal axis represents x coordinates and the vertical axis represents y coordinates. This is the same as a bird's eye view of the play map. Each cell can be identified in the form of (x axis, y axis). Specifically, each cell can be identified from (1, 1) to up to (32, 32). As shown in FIG. 7, as information corresponding to each cell, information indicating (the cumulative amount of) the defeat number of the defeated hostile army units in the cell, is indicated. In the present embodiment, the defeat number is indicated as an integer in a numerical range of 0 to 65535. When the defeat number is greater than 65535, the defeat number is temporarily reset to 0 as described above.

Returning to FIG. 6, the being-defeated-number information 414 indicates the being-defeated number in each of the cells that constitute the play map identified by the route ID 411 and the chapter ID 412. The data structure of the being-defeated-number information 414 is the same as that of the defeat-number information 413 described with reference to FIG. 7 (array data corresponding to up to 32×32 cells). Therefore, description thereof is omitted.

Figure 8:
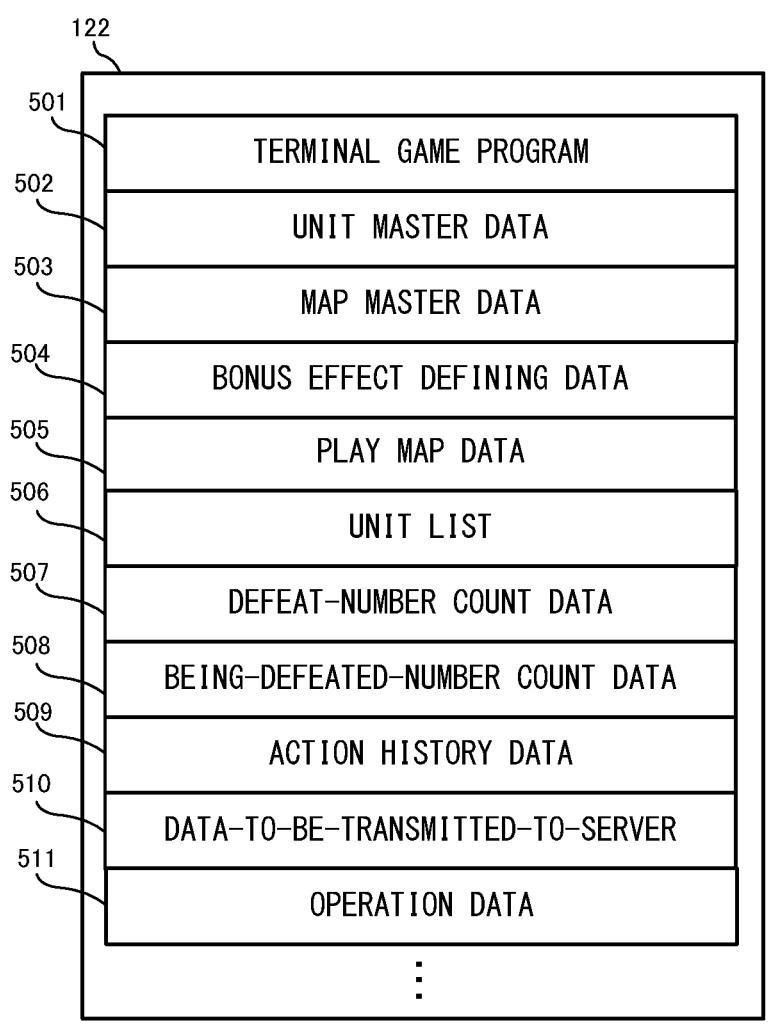
FIG. 8 illustrates a non-limiting example of data stored in a memory 122 of the information processing terminal 102.

Next, various data stored in a memory of the information processing terminal 102 will be described. FIG. 8 shows a non-limiting example of a memory map indicating examples of various data to be stored in the memory 122 of the information processing terminal 102. In the memory 122 of the information processing terminal 102, a terminal game program 501, unit master data 502, map master data 503, bonus effect defining data 504, play map data 505, a unit list 506, defeat-number count data 507, being-defeated-number count data 508, action history data 509, data-to-be-transmitted-to-server 510, operation data 511, and the like are stored.

The terminal game program 501 is a program for executing game processing according to the present embodiment. Specifically, the terminal game program 501 is a program for executing a process shown in a flow chart in FIG. 15 described below.

The unit master data 502 is a database for defining all the units that appear in this TBSG. That is, the unit master data 502 is data on which the player's side army unit 201 and the hostile army unit 202 are based, and includes various parameters for each unit and data representing an outer appearance or the like of each unit. A predetermined unit that appears in the play map is selected according to the play map, and various player's side army units 201 and various hostile army units 202 are generated based on the unit master data 502, and disposed on the play map.

Figures 9, 10:
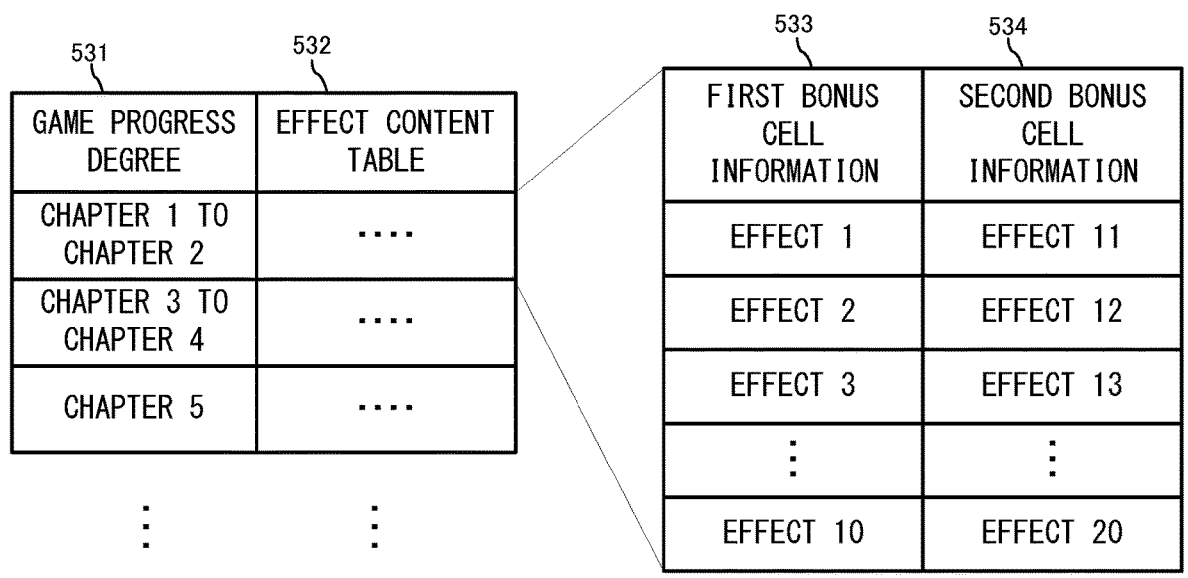
FIG. 9 illustrates a non-limiting example of a data structure of map master data 503.
FIG. 10 illustrates a non-limiting example of a data structure of bonus effect defining data 504.

The map master data 503 is a database for defining a basic structure of the play map. FIG. 9 illustrates a non-limiting example of the data structure of the map master data 503. The map master data 503 has items of a route ID 521, a chapter ID 522, and map structure information 523. The route ID 521 and the chapter ID 522 are information for identifying the play map. The map structure information 523 is information for defining a basic structure of the play map. Specifically, the map structure information 523 includes various kinds of information, other than the information about the bonus cell, for structuring the play map, for example, the map structure information 523 includes the size (the number of cells) of the play map, information indicating the topography of each cell, and the outer appearance and the topography effect of each cell. Furthermore, the map structure information 523 includes various kinds of information, about the play map, which is necessary for game processing, for example, the map structure information 523 includes information that defines victory conditions and being-defeated conditions in the map, which are not shown.

Returning to FIG. 8, the bonus effect defining data 504 defines various effects which are set in the above-described bonus cells. In the present embodiment, various effects obtained in the bonus cells are configured to be changed according to a degree of the game progress. FIG. 10 illustrates a non-limiting example of a data structure of the bonus effect defining data 504. The bonus effect defining data 504 has a game progress degree 531 and an effect content table 532. The game progress degree 531 is information that defines a degree of the game progress as described above. The effect content table 532 is data for defining the effect which is set in the bonus cell based on the degree of the game progress. The effect content table 532 includes first bonus cell information 533 that indicates a plurality of effect contents which can be set in the first bonus cells, and second bonus cell information 534 that indicates a plurality of effect contents which can be set in the second bonus cells. In the example shown in FIG. 10, when the degree of the game progress indicates "chapter 1 to chapter 2" of the story, ten effects of effect 1 to effect 10 are defined as the effects which can be set in the first bonus cells. Ten effects of effect 11 to effect 20 having different effect contents are defined as the effects which can be set in the second bonus cells. In the bonus cell setting process described below, any of the effect 1 to the effect 10 is selected and set for each first bonus cell. Similarly, any of the effect 11 to the effect 20 is selected and set for each second bonus cell.

Figures 11, 12:
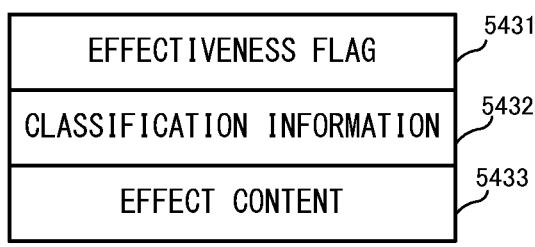
FIG. 11 illustrates a non-limiting example of a data structure of play map data 505.
FIG. 12 illustrates a non-limiting example of a data structure of bonus cell information 543.

Returning to FIG. 8, the play map data 505 is data for defining the play map. Specifically, the play map data 505 corresponds to the contents obtained by adding information about the bonus cells defined based on the server storage data 402 and the bonus effect defining data 504, to the map generated based on the map master data 503. FIG. 11 illustrates a non-limiting example of a data structure of the play map data 505. The play map data 505 includes items of coordinate information 541, topography information 542, bonus cell information 543, and other information 544, in the format of a table. The coordinate information 541 is information for specifying a position of each of the cells that constitute the play map. The topography information 542 indicates the topography of the cell. The bonus cell information 543 indicates whether or not the cell is an effective bonus cell, and also indicates the contents of the bonus cell when the cell is an effective bonus cell. FIG. 12 illustrates a non-limiting example of a data structure of the bonus cell information 543 in detail. The bonus cell information 543 includes an effectiveness flag 5431, classification information 5432, and an effect content 5433. The effectiveness flag 5431 is information that indicates whether or not the cell is an effective bonus cell. In the present embodiment, the effect for the bonus cell is exhibited only once. Therefore, a content indicating "effective" is set for the bonus cell in which the effect has not been exhibited, and a content indicating "non-effective" is set for the bonus cell in which the effect has been exhibited. Furthermore, "non-effective" is set as an initial value for cells which are not set as the bonus cells. The classification information 5432 indicates whether a cell is the first bonus cell or the second bonus cell when the cell is set as the bonus cell. In the present embodiment, when the bonus cell is indicated by using a visual effect, the visual effect may be different between the first bonus cell and the second bonus cell. The effect content 5433 is information that defines the content of the effect to be exhibited when a cell is set as the bonus cell.

Returning to FIG. 11, the other information 544 includes various kinds of information, for defining the play map, other than the above-described information. For example, various event contents (for example, conversation event) that are generated when a predetermined unit is moved to the cell are defined.

Returning to FIG. 8, the unit list 506 is information about the player's side army units 201 and the hostile army units 202 that appear in the play map. FIG. 13 illustrates a non-limiting example of a data structure of the unit list 506. The unit list 506 is data that includes items of a unit ID 551, an existence flag 552, hostile side/player's side information 553, class information 554, HP/MP information 555, position information 556, and the like, in the format of a table. The unit ID 551 is an ID for uniquely identifying the unit. The existence flag 552 is information indicating whether or not the unit exists on the play map. In other words, the existence flag 552 is information indicating whether or not a unit has been defeated. When the unit is not defeated, information indicating "exist" is set. When the unit has been defeated, information indicating "flee" is set. The hostile side/player's side information 553 indicates whether the unit is a "player's side army unit" or a "hostile army unit". The class information 554 indicates a kind of the unit. The HP/MP information 555 indicates a (the most recent) HP (hit point)/MP (magic point) of the unit. In the present embodiment, the unit having the HP of 0 is regarded as having been defeated, and "flee" is set in the existence flag 552. The position information 556 indicates a position of the unit. When the existence flag 552 indicates "exist", the position information 556 indicates what cell the unit is currently on. When the existence flag 552 indicates "flee", the position information 556 indicates a position (cell) at which the unit has been defeated (that is, indicates the last position of the unit).

Returning to FIG. 8, the defeat-number count data 507 indicates the defeat number of the hostile army units having been defeated and the cells at which the hostile army units have been defeated. That is, the defeat-number count data 507 includes information indicating how many hostile army units have been defeated and the cells at which the hostile army units have been defeated. The defeat-number count data 507 is structured as array data corresponding to up to 32×32 cells according to the size (the number of cells) of the play map. FIG. 14 illustrates a non-limiting example of an image of a data structure of the defeat-number count data 507. Similarly to the defeat-number information 413 of the server storage data 402 described above, in FIG. 14, the defeat-number count data 507 is indicated in the format of a two-dimensional table in which the horizontal axis represents x coordinates and the vertical axis represents y coordinates. Each time a hostile army unit is defeated in a predetermined cell, 1 is added to the defeat number corresponding to the cell.

Returning to FIG. 8, the being-defeated-number count data 508 indicates the number of the player's side army units having been defeated, and the cells at which the player's side army units have been defeated. That is, the being-defeated-number count data 508 is information indicating how many player's side army units have been defeated and the cells at which the player's side army units have been defeated. The data structure is the same as that of the defeat-number count data 507, and the description thereof is omitted.

Next, the action history data 509 represents, as a history, an action of each unit in each turn. The TBSG of the present embodiment has a "return function" that allows a player to return some turns and perform the returned turns again, which will be described below in detail. The action history data 509 is used when the return function is used by a player.

The data-to-be-transmitted-to-server 510 is used when the defeat number and the being-defeated number counted by using the defeat-number count data 507 and the being-defeated-number count data 508 are transmitted to the server 101. The data structure of the data-to-be-transmitted-to-server 510 is the same as the data structure of one record (corresponding to one lateral row in FIG. 11) of the server storage data 402 (see FIG. 11) described above.

The operation data 511 indicates a content of an operation performed by a player on the operation unit 123, and is transmitted from the operation unit 123 to the processor 121 at predetermined time intervals. The operation data 511 includes information representing pressed states of various buttons, coordination information of an input to a touch panel, and the like.

Various other data, such as BGM data, which is necessary for the TBSG process is also stored in the memory 122, which is not shown.

Next, information processing according to the present embodiment will be described in detail with reference to flow charts shown in FIG. 15 to FIG. 25. The process for the TBSG as described above is mainly performed by the information processing terminal 102, and communication with the server 101 is partially performed as described above. Therefore, the process performed by the server 101 will be briefly described before the process performed by the information processing terminal 102 is described.

[Details of Process Performed by the Server 101]

In the server 101, a process of transmitting the server storage data 402 according to a request from the information processing terminal 102 is performed as appropriate. Furthermore, a process of receiving the data-to-be-transmitted-to-server 510 transmitted from the information processing terminal 102 and updating the server storage data 402 based on the contents thereof is performed as appropriate.

[Details of Process Performed by the Processor 121]

Figure 15:
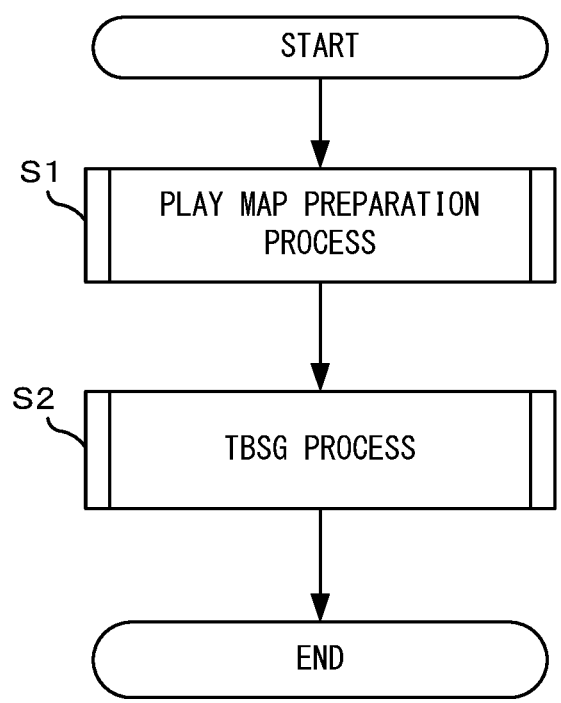
FIG. 15 is a flow chart showing in detail a non-limiting example of game processing according to the exemplary embodiment.

Next, game processing performed by the information processing terminal 102 will be described in detail. FIG. 15 is a flow chart showing a non-limiting example of game processing performed by the processor 121 of the information processing terminal 102. The processing is performed according to a player providing, through the operation unit 123, an instruction for starting the TBSG process using the play map. Firstly, in step S1, the processor 121 performs a process for preparing the play map as described above. Thereafter, the processor 121 performs the TBSG process using the prepared play map.

Figure 16:
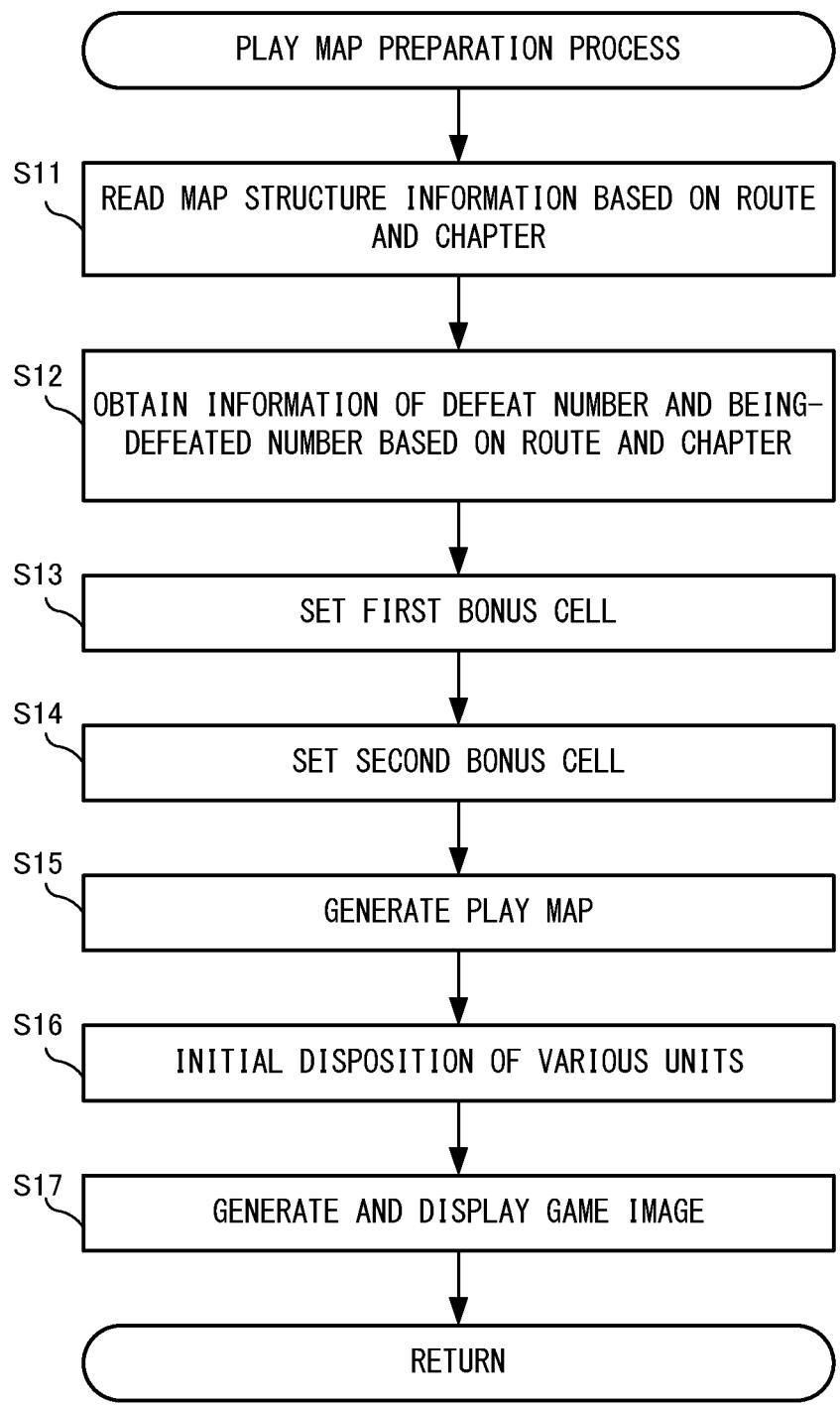
FIG. 16 is a flow chart showing a non-limiting example of a play map preparation process in detail.

FIG. 16 is a flow chart showing a non-limiting example of a play map preparation process of step S1 in detail. Firstly, in step S11, the processor 121 determines the current game progressing state, that is, determines the route ID and the chapter ID corresponding to the current route and chapter. Next, the processor 121 obtains the map structure information 523 corresponding to the current route and chapter, from the map master data 503. The processor 121 generates the play map data 505 based on the map structure information 523. At this time point, nothing is set in the bonus cell information 543 of the play map data 505.

Next, in step S12, the processor 121 performs a process of obtaining information of the defeat number and the being-defeated number from the server 101. Specifically, a request for transmission of the defeat-number information 413 and the being-defeated-number information 414 based on the current route and chapter is transmitted to the server 101. In response thereto, the corresponding defeat-number information 413 and being-defeated-number information 414 are transmitted from the server 101. The processor 121 receives the defeat-number information 413 and the being-defeated-number information 414 which are transmitted from the server 101.

For this reception process, in another exemplary embodiment, the entirety of the server storage data 402 may be received. The processor 121 may identify and obtain the defeat-number information 413 and the being-defeated-number information 414 corresponding to the current route and chapter with reference to the received server storage data 402.

Next, in step S13, the processor 121 performs a process of setting positions and effects of the three first bonus cells based on the received being-defeated-number information 414. Specifically, the processor 121 specifies the positions of the top three cells in the order starting from the greatest being-defeated number with reference to the received being-defeated-number information 414. Next, the processor 121 selects the effect content table 532 according to the current degree of the game progress with reference to the bonus effect defining data 504. The processor 121 determines the effect in each of the three specified cells with reference to the first bonus cell information 533. Specifically, the processor 121 selects any one of the effects defined in the first bonus cell information 533, at random, for each cell. The processor 121 sets the bonus cell information 543 based on the determined content. Specifically, firstly, the processor 121 specifies the coordinate information 541 corresponding to the three specified cells with reference to the play map data 505 generated in step S11. The processor 121 sets the following information in the bonus cell information 543 corresponding to each piece of the coordinate information 541. Firstly, the information indicating "effective" is set in the effectiveness flag 5431. The information indicating the "first bonus cell" is set in the classification information 5432. The information indicating the content of the effect determined in the above-described process is set in the effect content 5433. Thus, three first bonus cells are set in the play map data 505.

Next, in step S14, the processor 121 performs a process of setting positions and effects of the ten second bonus cells based on the received defeat-number information 413. Specifically, the processor 121 specifies the positions of the top ten cells in the order starting from the greatest defeat number with reference to the received defeat-number information 413. Next, the processor 121 determines the effect in each of the ten specified cells, at random, with reference to the second bonus cell information 534. The processor 121 sets, in the play map data 505, the information of the ten second bonus cells for which the effects have been determined. At this time, the information indicating the "second bonus cell" is set in the classification information 5432. Furthermore, the processor 121 sets information indicating "non-effective" in the effectiveness flag 5431 of the bonus cell information 543 for the cells which are not set as the first bonus cell and the second bonus cell.

When the second bonus cell is set, a method for extracting the top ten cells in the order starting from the greatest defeat-number is used. Therefore, the same cell as the cell that is set as the first bonus cell may be selected as a candidate that is set as the second bonus cell. In this case, the first bonus cell is controlled so as to be prioritized. For example, when, as a result of extracting the top ten cells, the cell at the fifth order position is the same as the cell that has been set as the first bonus cell, the cell at the fifth order position is not adopted as the second bonus cell, and the cell at the subsequent order position is controlled to be selected. In the present embodiment, the total number of the second bonus cells to be set is 10. Therefore, the cell at the eleventh order position in the order starting from the greatest defeat number is selected as the tenth cell.

When a plurality of the cells are at the same order position in each of the first bonus cell and the second bonus cell (as long as the first bonus cell and the second bonus cell do not overlap each other), a plurality of cells at the same order position are selected such that the total number of the bonus cells to be set is not exceeded. For example, it is assumed that, when the top ten cells in the order starting from the greatest defeat number are extracted, the number of the cells at each of the first to the eighth order positions is one and the number of the cells at the tenth order position is one, and the number of the cells at the ninth order position is two. In this case, the cell at the tenth order position is not adopted, and eight cells at the first to the eighth order positions and 2 cells at the ninth order positions are adopted, and are set as the ten second bonus cells in total. Furthermore, when the number of cells at the ninth order position is not two but three, two cells among them are selected. In this case, two of the cells at the same order position may be selected by using a predetermined ordering algorithm, or may be selected at random.

For example, at a time immediately after the game is released, although the top ten cells in the order starting from the greatest defeat number are attempted to be extracted as candidates that are to be set as the second bonus cells, ten cells may not be obtained (this may apply to the first bonus cell). In this case, a cell at a previously defined position may be set as the bonus cell.

When the first bonus cell and the second bonus cell have been set as described above, the processor 121 subsequently generates, in step S15, the play map based on the play map data 505 in which the bonus cell information 543 has been set.

Next, in step S16, the processor 121 arranges various units on the play map. In the subsequent step S17, the processor 121 causes the virtual camera to take an image of the play map and a virtual game space in which various units are arranged, generates a game image, and outputs the game image to the display section 124. At this time, the game image is generated so as to exhibit a predetermined visual effect for each bonus cell for which the effectiveness flag 5431 is "effective", such that a player is allowed to visually recognize the (effective) bonus cell. Different visual effects are exhibited for the first bonus cell and the second bonus cell, respectively. The play map preparation process ends with this.

After the game image is output, an operation performed by a player may be received in order to allow the player to change a position at which the player's side army unit 201 is disposed. The play map preparation process may end with the determination operation for the change.

Figure 17:
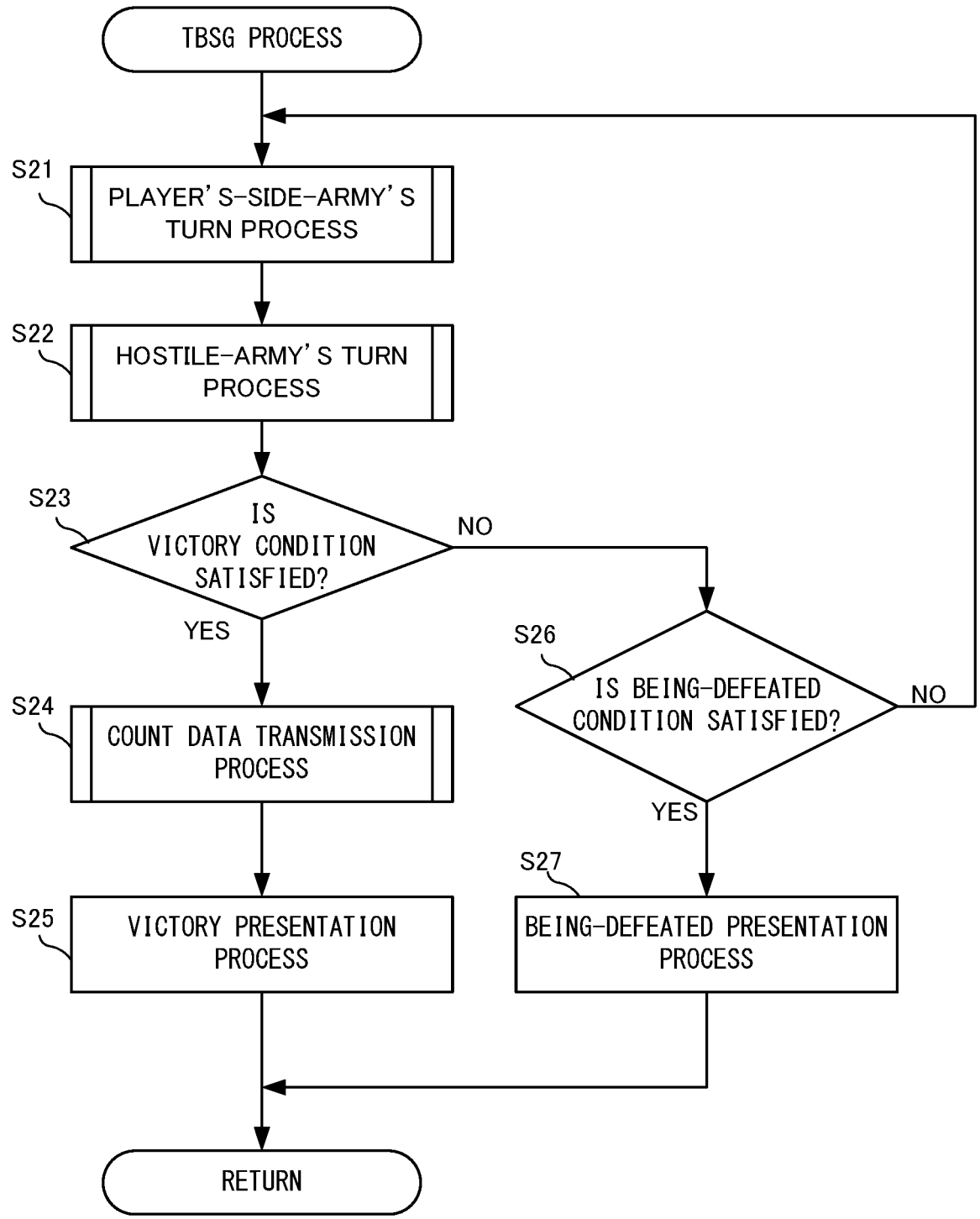
FIG. 17 is a flow chart showing a non-limiting example of a TBSG process in detail.

Next, the TBSG process of step S2 will be described in detail. FIG. 17 is a flow chart showing a non-limiting example of the TBSG process in detail. Firstly, in step S21, the player's-side-army's turn process is performed. In this process, an action of the player's side army unit 201 is controlled based on the operation performed by the player, and various game processing is performed.

Figure 18:
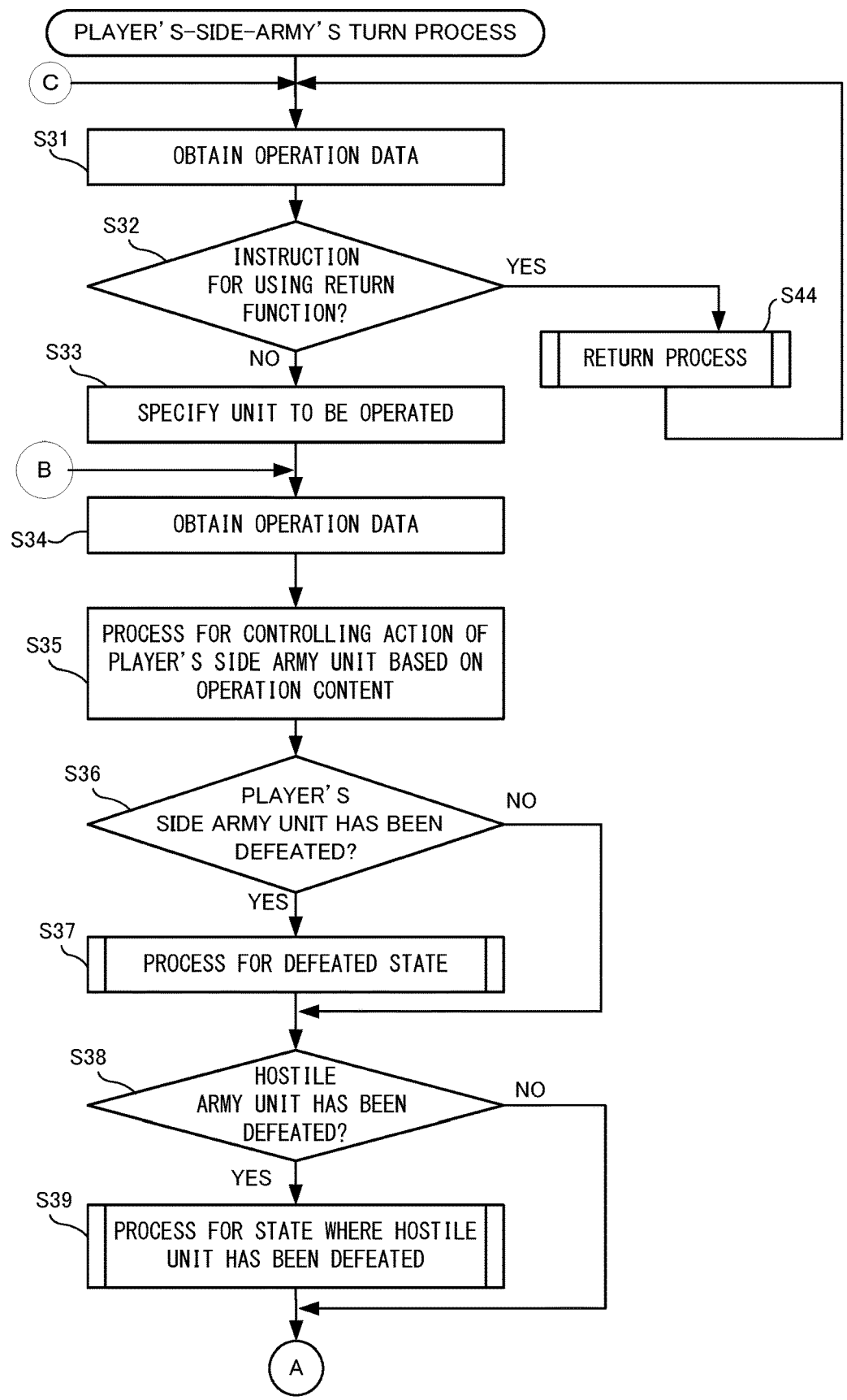
FIG. 18 is a flow chart showing a non-limiting example of a player's side army's turn process in detail.
Figure 19:
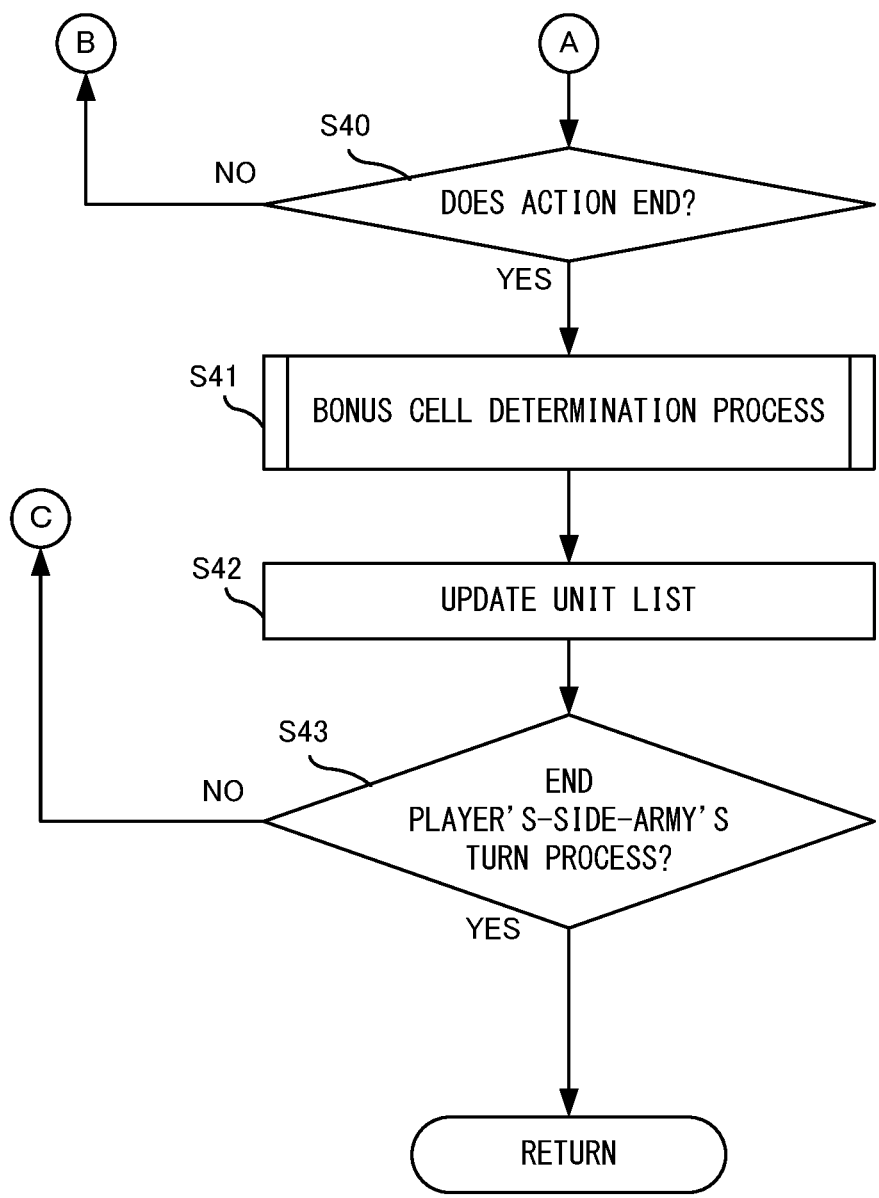
FIG. 19 is a flow chart showing a non-limiting example of the player's side army's turn process in detail.

FIG. 18 to FIG. 19 are each a flow chart showing a non-limiting example of the player's-side-army's turn process in detail. Firstly, in step S31, the processor 121 obtains the operation data 511.

Next, in step S32, the processor 121 determines whether or not the content of the operation represents an instruction for using a "return" function. As described above, the return function is a function for allowing a player to return some turns and perform the returned turns again (which will be described below in detail).

When the result of the determination indicates that the content of the operation does not represent an instruction for return (NO in step S32), the processor 121 subsequently specifies, in step S33, a unit to be operated as a current operation subject among the player's side army units 201, based on the content of the operation. A game image having various visual effects (display of a movement-allowed range, or the like) for allowing a player to recognize a current operation subject, is generated and displayed.

Next, in step S34, the processor 121 obtains the operation data 511. In the subsequent step S35, the processor 121 performs a process of controlling an action of the unit to be operated, based on the content of the operation. The content of the action is, for example, "move", "attack a hostile army unit", "use an item, magic", or the like". In the case of "move", the unit to be operated is controlled to move to a cell designated by the player. In the case of "attack a hostile army unit", a process for fight between the unit to be operated and a hostile army unit specified as an object to be attacked is performed. As a result, various parameters such as the HP are changed (for example, consumption and/or subtraction of a parameter).

Figure 20:
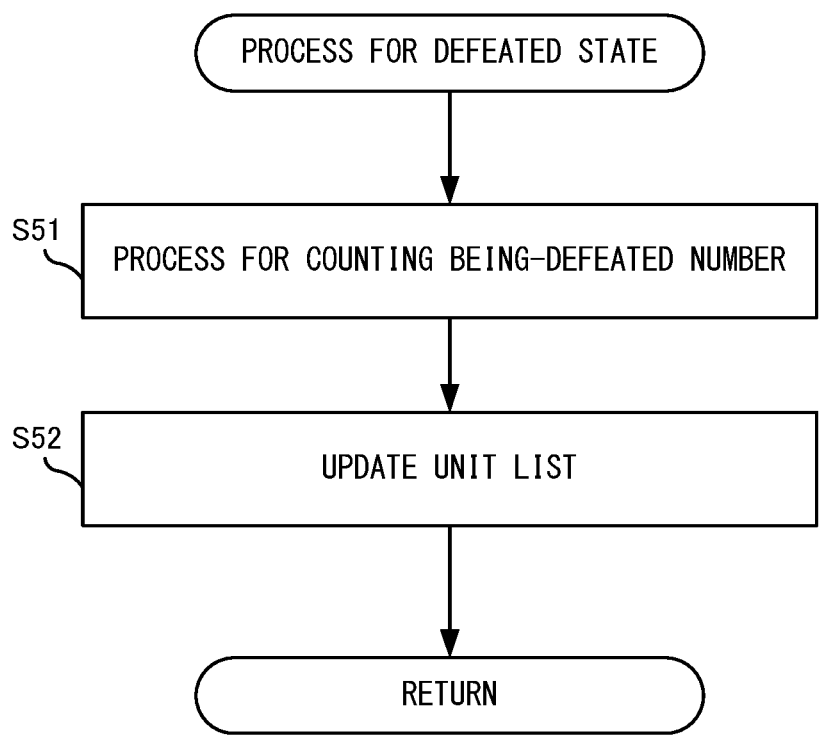
FIG. 20 is a flow chart showing a non-limiting example of a process for a defeated state in detail.

Nest, in step S36, the processor 121 determines whether or not the player's side army unit 201 has been defeated. That is, the processor 121 determines whether or not the player's side army unit 201 in which the HP is 0 is among the player's side army units 201 in each of which the existence flag 552 represents "exist". When the result of the determination indicates that the player's side army unit 201 has been defeated, the processor 121 performs a process for a defeated state in step S37. This is a process for counting the being-defeated number. FIG. 20 is a flow chart showing a non-limiting example of the process for a defeated state in detail. Firstly, in step S51, the processor 121 specifies a cell at which the player's side army unit 201 has been defeated. The processor 121 adds one to the being-defeated number, for the cell, corresponding to the being-defeated-number count data 508.

Next, in step S52, the processor 121 sets, as "flee", the existence flag 552 for the player's side army unit 201 having been defeated. Furthermore, the processor 121 sets, in the position information 556, a position of the cell at which the defeated player's side army unit 201 has been disposed, and updates the unit list 506. The process for the defeated state ends with this.

Returning to FIG. 18, when the result of the determination in step S36 indicates that the player's side army unit 201 is not defeated (No in step S36), the process step of step S37 is not performed and the process proceeds to the subsequent step.

Figure 21:
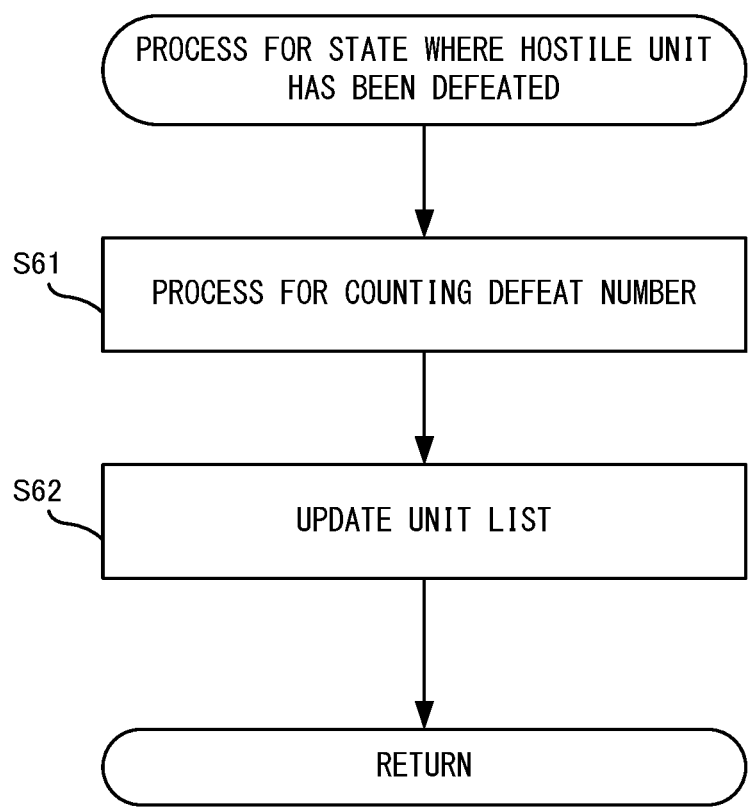
FIG. 21 is a flow chart showing a non-limiting example of a process for a state where a hostile unit has been defeated in detail.

Next, in step S38, the processor 121 determines whether or not the hostile army unit 202 has been defeated. That is, the processor 121 determines whether or not the hostile army unit 202 in which the HP is 0 is among the hostile army units 202 in each of which the existence flag 552 represents "exist". When the result of the determination indicates that the hostile army unit 202 has been defeated (YES in step S38), the processor 121 performs a process for a state where a hostile unit has been defeated, in step S39. This is a process for counting the defeat number. FIG. 21 is a flow chart showing a non-limiting example of the process for a state where a hostile unit has been defeated, in detail. Firstly, in step S61, the processor 121 specifies a cell at which the defeated hostile army unit 202 has been disposed. The processor 121 adds one to the defeat number, for the cell, corresponding to the defeat-number count data 507.

Next, in step S62, the processor 121 sets, as "flee", the existence flag 552 for the hostile army unit 202 having been defeated. Furthermore, the processor 121 sets, in the position information 556, a position of the cell at which the defeated hostile army unit 202 has been disposed, and updates the unit list 506. The process for the state where a hostile unit has been defeated ends with this.

Returning to FIG. 18, when the result of the determination in step S38 indicates that the hostile army unit 202 is not defeated (NO in step S38), the process step of step S39 is not performed, and the process proceeds to the subsequent step.

Next, in step S40 in FIG. 19, the processor 121 determines whether or not the unit to be operated "ends an action". The unit to be operated automatically "ends an action" not only when the player explicitly designates "end an action" but also when the player's unit has been defeated. When the result of the determination does not indicate "end an action" (NO in step S40), the process is returned to step S34, and the process for the unit to be operated is repeated.

Figure 22:
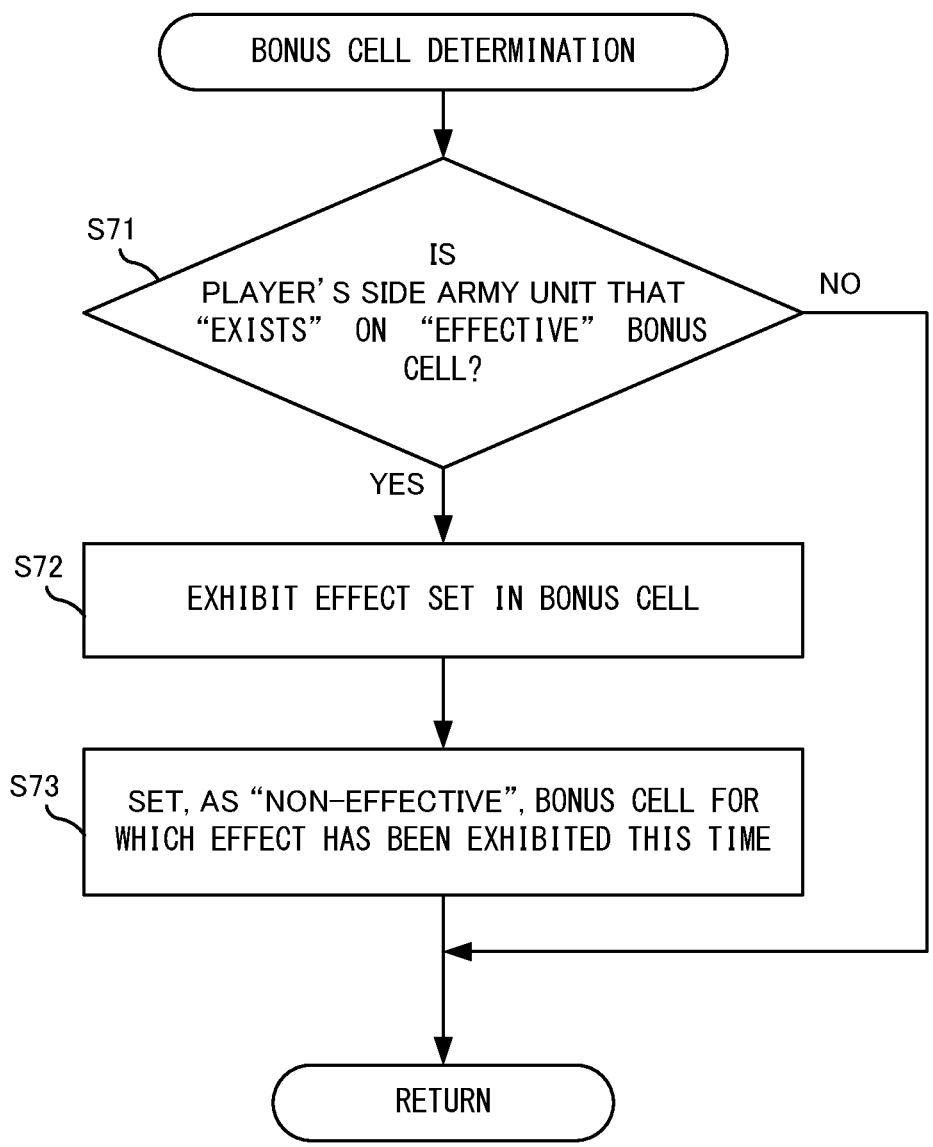
FIG. 22 is a flow chart showing a non-limiting example of a bonus cell determination process in detail.

Meanwhile, when the unit to be operated "ends an action" (YES in step S40), the processor 121 performs a bonus cell determination process in step S41. This process is for exhibiting, when the action ends on a bonus cell, an effect set in the bonus cell. FIG. 22 is a flow chart showing a non-limiting example of the bonus cell determination process in detail. Firstly, in step S71, the processor 121 determines whether or not player's side army unit in which the existence flag 552 indicates "exist" is on the bonus cell in which "effective" is set in the effectiveness flag 5431. Therefore, in a case where the player's side army unit has been defeated before ending an action, the player's side army unit does not satisfy this condition (since "flee" is set in the existence flag 552). When the result of the determination indicates that the player's side army unit that is in "existence" is not on the "effective" bonus cell (NO in step S71), the bonus cell determination process ends (that is, the effect set in the bonus cell is not exhibited). Meanwhile, when the player's side army unit which is in the "existence" is on the "effective" bonus cell (YES in step S71), the processor 121 subsequently performs, in step S72, a process for exhibiting the effect defined in the effect content 5433 corresponding to the bonus cell. For example, a process of restoring the HP (in the case of the first bonus cell), or a process for providing a predetermined weapon item to the player's side army unit 201 (in the case of the second bonus cell) is performed.

Next, in step S73, the processor 121 sets "non-effective" in the effectiveness flag 5431 corresponding to the bonus cell for which the effect has been exhibited this time. This can prevent the effect from being exhibited for the cell after that. The bonus cell determination process ends with this.

Returning to FIG. 19, the processor 121 subsequently updates the content of the unit list 506 in step S42 such that a state after the end of the action is reflected in the unit list 506. For example, when a player has merely moved the unit to be operated and ended the action of the unit to be operated, the processor 121 updates the unit list 506 such that the position, of the unit to be operated, at the end of the action is reflected in the position information 556.

Next, in step S43, the processor 121 determines whether or not the player has made an instruction for ending the player's-side-army's turn. When the instruction for the end is not made (NO in step S43), the process is returned to step S31 and repeated. When the instruction for ending the player's-side-army's turn is made (YES in step S43), the processor 121 ends the player's-side-army' turn process.

Next, a case where the result of the determination in step S32 indicates that the content of the operation is an instruction for "return" (YES in step S32) will be described. In this case, in step S44, the processor 121 performs the return process. In the return process, a predetermined number of turns can be returned based on the content of the operation performed by the player. In the present embodiment, an exemplary case where the return is performed in units of turns, will be described. That is, the play can be returned in units of turns such that the play is returned to one turn previous play, two turns previous play . . . . In order to perform such a return process, for example, the content of the unit list 506 at the start of each turn is copied and stored in the action history data 509. In another exemplary embodiment, the return may be performed not for each turn but for each unit.

Figure 23:
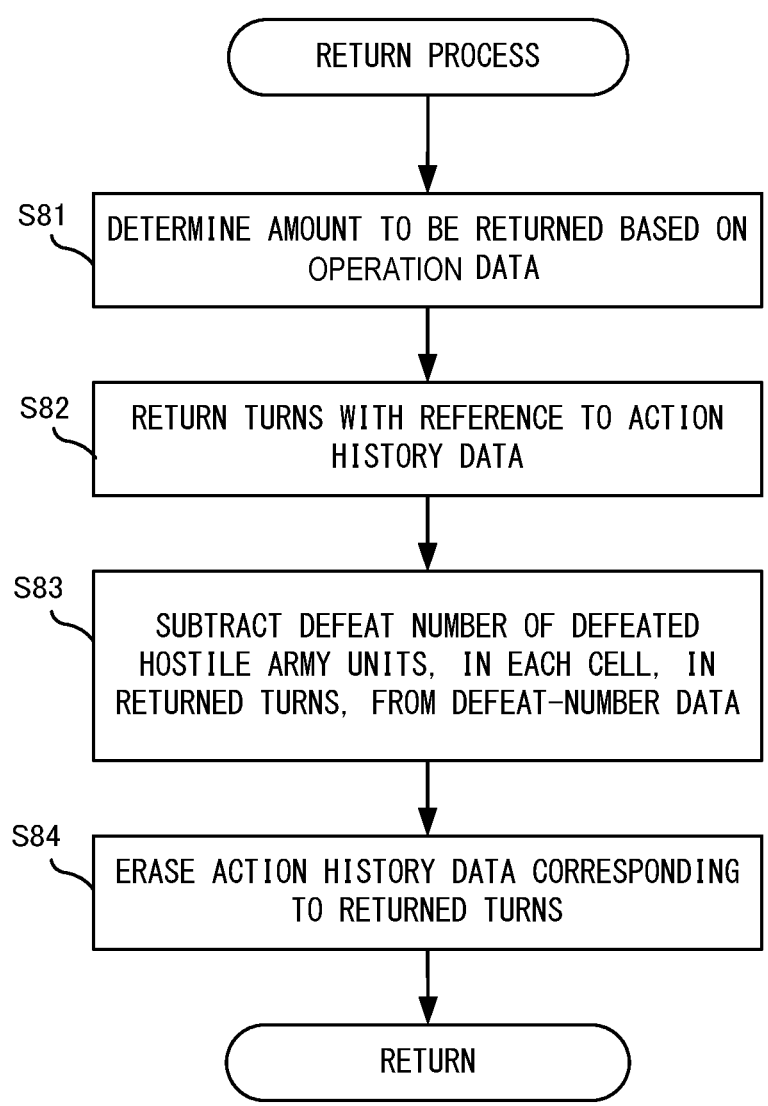
FIG. 23 is a flow chart showing a non-limiting example of a return process in detail.

FIG. 23 is a flow chart showing a non-limiting example of the return process in detail. Firstly, in step S81, the processor 121 determines an amount to be returned (the number of turns to be returned) based on the operation data 511. Next, in step S82, the processor 121 performs a process of returning the number of turns with reference to the action history data 509. As a result, a state at the start of the returned-turns-previous operation content is reproduced. For example, in the case of two turns being returned, states and disposition of various kinds of units are changed so as to reproduce a state at the start of two-turns-previous operation content. According thereto, the content for the returned turns in the action history data 509, is also erased.

Next, in step S83, the processor 121 performs a process of subtracting the defeat number, in each cell, in the returned turns, from the defeat-number count data 507. That is, the process is performed such that the return process is reflected also in the defeat-number count data 507. In the present embodiment, when the return process is performed, the return process is not reflected in the being-defeated-number count data 508. For example, a case where, after one player's side army unit has been defeated in the sixth turn, the return to the fourth turn is performed, is assumed. In this case, the defeat number of the hostile units which have been defeated between the fourth turn and the sixth turn is subtracted and the defeat number of the hostile units is returned to the previous number (the defeat number is not counted.). However, the number of the player's side army units which have been defeated in the sixth turn is not subtracted and the number of the player's side army units is not returned to the previous number. Therefore, if the player's side army unit is defeated in the same cell after the return, the being-defeated number is further added. This is because the set number of the first bonus cells is less than the set number of the second bonus cells, and influence on the player is great when the player's side army unit is defeated, and, therefore, data for the defeated state is to be collected as much as possible and is to be provided to the player. That is, in general, the number of the player's side army units that appear on the play map is set to be less than the number of the hostile army units, and, therefore, the player may consider that reduction (defeated state) of the number of the player's side army units is to be prevented as much as possible. Therefore, as much data as possible is to be collected for a cell at which the player's side army unit is defeated, and "a dangerous place at which the player's side army unit is likely to be defeated" is to be presented as the first bonus cell. Meanwhile, a position at which a hostile unit is defeated is less valuable than a position at which the player's side army unit is defeated. Therefore, the number of the hostile units is returned to the previous number.

Next, in step S84, the processor 121 erases the contents of the action history data 509 corresponding to the returned turns. Thereafter, a game image obtained by taking an image of a virtual game world in a returned state is generated and displayed. The return process ends with this.

Returning to FIG. 18, when the return process has been ended, the process is returned to step S31. Thus, the player's-side-army's turn is started in the returned state. Description of the player's-side-army's turn process is ended with this.

Returning to FIG. 17, subsequently, in step S22, a hostile-army's turn process is performed. The hostile-army's turn process is the same as the player's-side-army's turn process except that the processor 121 (AI) instead of a player operates the hostile army units, and the return process is not performed in the hostile-army's turn process.

Figure 24:
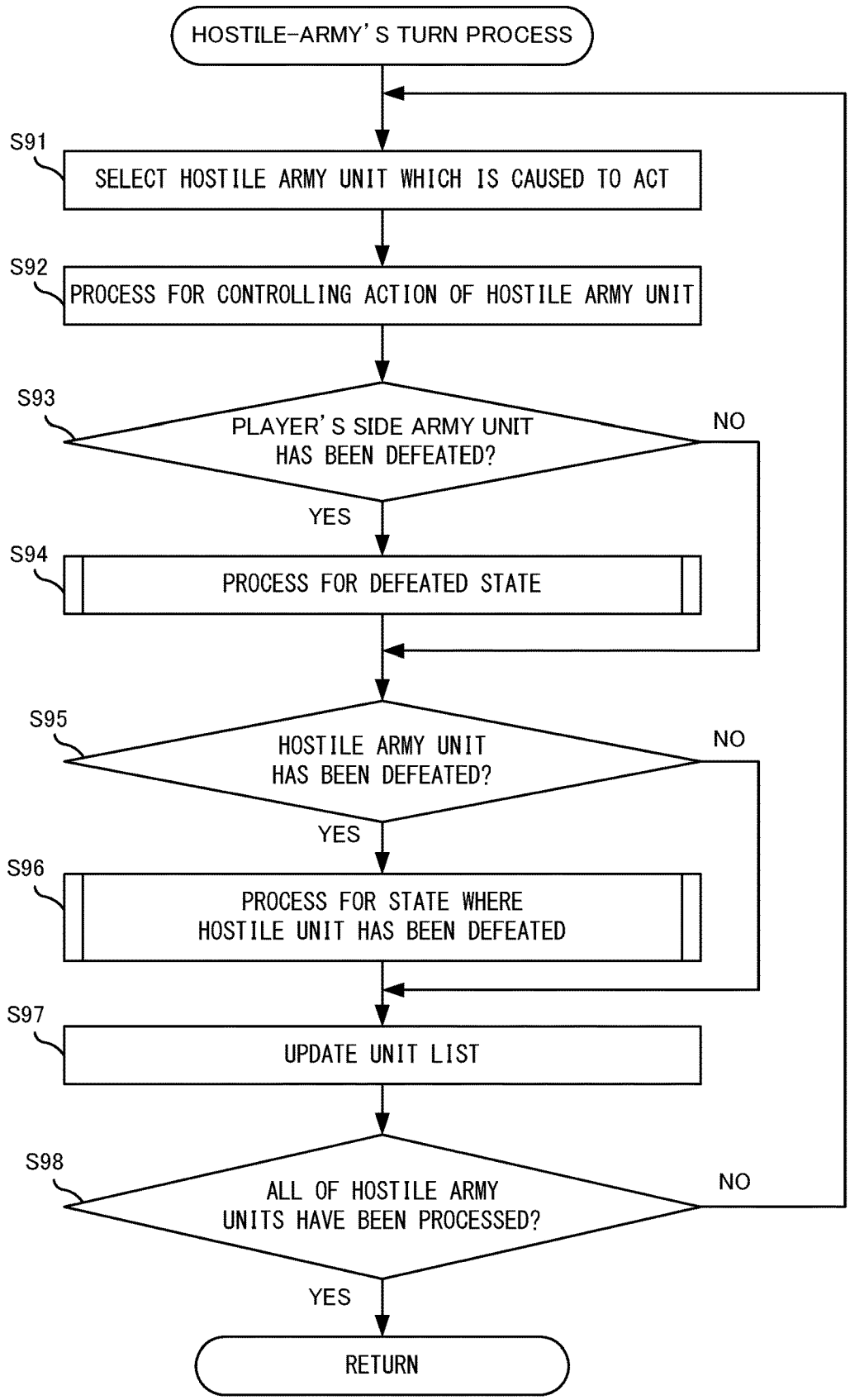
FIG. 24 is a flow chart showing a non-limiting example of a hostile-army's turn process in detail.

FIG. 24 shows a non-limiting example of the hostile-army's turn process in detail. Firstly, in step S91, the processor 121 selects a hostile army unit which is caused to act. In the subsequent step S92, the processor 121 controls an action of the hostile army unit which is caused to act. That is, for example, a movement process and a process of attacking the player's side army unit are performed.

Next, in step S93, the processor 121 determines whether or not the player's side army unit 201 has been defeated. When the player's side army unit 201 has been defeated (YES in step S93), the processor 121 performs a process for a defeated state in step S94. This process is the same as the process step of step S37, and the description thereof is omitted. When the player's side army unit 201 is not defeated (NO in step S93), the process step of step S94 is skipped.

Next, in step S95, the processor 121 determines whether or not the hostile army unit 202 has been defeated. When the hostile army unit 202 has been defeated (YES in step S95), the processor 121 performs a process for a state where a hostile army unit has been defeated in step S96. This process is the same as the process step of step S39, and the description thereof is omitted. When the hostile army unit 202 is not defeated (NO in step S95), the process step of step S96 is skipped.

Next, in step S97, the processor 121 updates the unit list 506 such that the result of the action of the hostile army unit which is caused to act is reflected in the unit list 506. In the subsequent step S98, the processor 121 determines whether or not all the hostile army units that are in "existence" at that time, have "ended actions". When a hostile army unit that has not "ended an action" is remaining (NO in step S98), the process is returned to step S91 and repeated. When all the hostile army units have "ended actions" (YES in step S98), the hostile-army's turn process ends.

Figure 25:
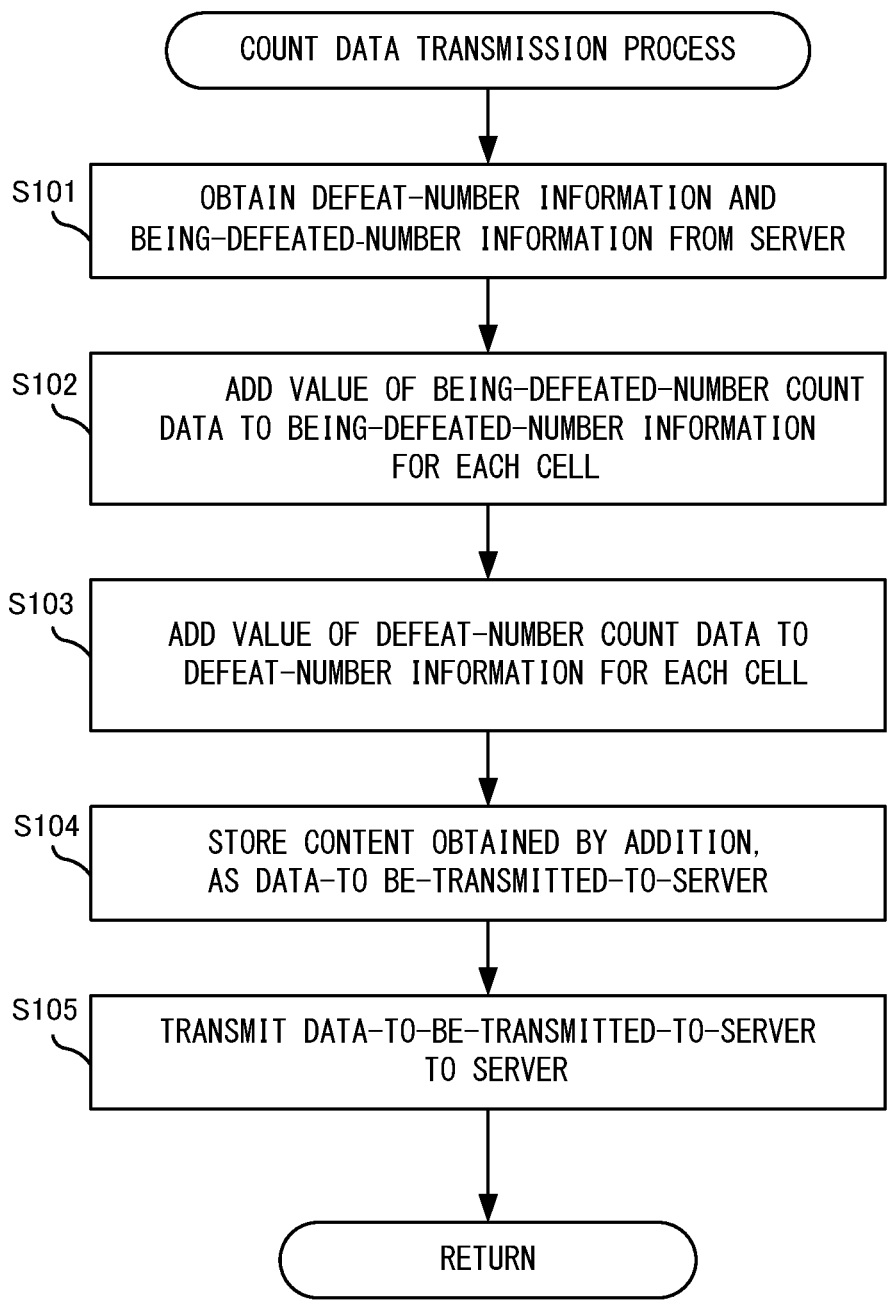
FIG. 25 is a flow chart showing a non-limiting example of a count data transmission process in detail.

Returning to FIG. 17, in step S23, the processor 121 subsequently determines whether or not a victory condition which is set in the currently played play map has been satisfied. When the result of the determination indicates that the victory condition has been satisfied (YES in step S23), the processor 121 performs a count data transmission process in step S24. In this process, information about the defeat number and the being-defeated number which have been counted before the play map having been played this time is cleared, is transmitted to the server 101. FIG. 25 is a flow chart showing a non-limiting example of the count data transmission process in detail. Firstly, in step S101, the processor 121 obtains, from the server 101, the defeat-number information 413 and the being-defeated-number information 414 corresponding to the route and chapter (that is, the play map which has been cleared this time) in the same process as the process step of step S12. That is, the most recent defeat-number information and being-defeated-number information at this time point are obtained.

Next, in step S102, the processor 121 performs a process of adding the content of the being-defeated-number count data 508 to the content of the being-defeated-number information 414. That is, the processor 121 adds the being-defeated number, for the corresponding cell, which is in the being-defeated-number count data 508 to the being-defeated number, for the cell, which is in the being-defeated-number information 414. At this time, when the result of the addition indicates that a cell in which the being-defeated number exceeds a predetermined value (in the present embodiment, 65535) is present, the processor 121 sets the being-defeated number to 0 for the cell. That is, the processor 121 resets the being-defeated number.

Next, in step S103, the processor 121 performs a process of adding the content of the defeat-number count data 507 to the content of the defeat-number information 413. That is, the processor 121 adds the defeat number, for the corresponding cell, which is in the defeat-number count data 507 to the defeat number, for the cell, which is in the defeat-number information 413. Also at this time, similarly to step S102, when the result of the addition indicates that the defeat number exceeds a predetermined value, the processor 121 resets the defeat number for the cell.

Next, in step S104, the processor 121 stores, as the data-to-be-transmitted-to-server 510, data including the defeat-number information 413 and the being-defeated-number information 414 obtained by the addition, and the route ID 411 and the chapter ID 412 corresponding to the play map which has been played this time.

Next, in step S105, the processor 121 communicates with the server 101, to transmit the data-to-be-transmitted-to-server 510 to the server 101. According thereto, the server 101 performs a process of receiving the data-to-be-transmitted-to-server 510, and updating the contents of the defeat-number information 413 and the being-defeated-number information 414 which are specified by the route ID 411 and the chapter ID 412. The count data transmission process ends with this.

Returning to FIG. 17, in step S25, the processor 121 subsequently performs a process of displaying a predetermined victory presentation. Thereafter, the TBSG process ends.

Meanwhile, when the result of the determination in step S23 indicates that the victory condition is not satisfied (NO in step S23), the processor 121 determines in step S26 whether or not a being-defeated condition which is set in the currently played play map is satisfied. When the result of the determination indicates that the being-defeated condition is not satisfied (NO in step S26), the process is returned to step S21, and the TBSG process is repeated. Meanwhile, when the being-defeated condition is satisfied (YES in step S26), the processor 121 performs a process of displaying a predetermined being-defeated presentation in step S27, and the TBSG process ends. In the present embodiment, the count data transmission process is performed only when the victory condition of the play map is satisfied. However, in another exemplary embodiment, the count data transmission process may be performed also when the being-defeated condition is satisfied. Furthermore, in another example, when the being-defeated condition is satisfied, only the information of the being-defeated number may be transmitted. As described above, it is because as much data as possible is to be collected for the cell in which the player's side army unit is defeated.

The detailed description of the game processing according to the present embodiment ends with this.

As described above, in the present embodiment, the defeat number of the defeated hostile army units in each cell in the play map and the being-defeated number of the defeated player's side army units therein are transmitted to the server 101 based on the play results from a plurality of players. Therefore, data obtained by aggregating each of the defeat-numbers and the being-defeated numbers in each cell is stored in the server 101. When the TBSG is started by using a play map, positions of the bonus cells are set based on the defeat number and the being-defeated number. Therefore, even in the same play map, the disposition of the bonus cells is different when a play start time is different. Therefore, disposition of the bonus cells can be effectively and automatically changed according to the tendency of actual play contents from a plurality of players. Thus, the disposition (structure) of the map in the TBSG can be continuously changed to enhance interactivity of the TBSG.

Modification

In the above-described exemplary embodiment, the information processing terminal 102 determines positions at which the bonus cells are disposed, based on the defeat number and the being-defeated number. In another exemplary embodiment, the server 101 may determine positions at which the bonus cells are disposed, based on the defeat number and the being-defeated number, and transmit the setting data indicating the determined positions of the bonus cells, to the information processing terminal 102. For example, in the play map preparation process, the server 101 may perform the process steps corresponding to step S12 to S14, and transmit the setting data indicating the positions of the bonus cells to the information processing terminal 102. Then, the information processing terminal 102 may generate the play map in which the bonus cells are set, based on the setting data.

In the above-described exemplary embodiment, the defeat number is counted for all the hostile army units. In another exemplary embodiment, the defeat number may not be counted for some hostile army unit, according to the content of the play map. For example, a boss character which is disposed at a fixed position on the play map and does not move from the cell may not be counted so as to be included in the defeat number even if the boss character is defeated. For such a hostile army unit which does not move, the defeated cell is also fixed, and the defeat number in the cell tends to be inevitably greater than the defeat number in the other cells. If a bonus cell disposed at a fixed position is included, randomness of the positions at which the bonus cells are disposed may be reduced. Therefore, in another exemplary embodiment, the defeat number may not be counted for such a hostile army unit which is fixedly disposed.

Other examples of the hostile army unit for which the defeat number is not counted include the hostile army units which infinitely appear unless the victory condition or the being-defeated condition is satisfied. Examples thereof include the hostile army units that appear as a "dispatched troop" or "reinforcements". The defeat number is likely to extremely increase for such hostile army units at some cells depending on the positions where they appear, and the positions at which the bonus cells are disposed may not be changed well. Therefore, the defeat number may not be counted for such hostile army units.

In the above-described exemplary embodiment, the defeat-number and the being-defeated number are transmitted to the server 101 at a time when the victory condition has been satisfied (time at which the defeat number and the being-defeated number are determined). In another exemplary embodiment, the defeat number may be determined and transmitted when the victory condition has been satisfied while the being-defeated number may be transmitted to the server 101 each time the player's side army unit is defeated (that is, may be transmitted in real time). This is because as much data as possible is to be collected for the cell at which the player's side army unit is defeated.

In the above-described exemplary embodiment, when the hostile army unit is defeated, the defeat number is counted as one even for the same cell each time the hostile army unit is defeated. In another exemplary embodiment, the defeat number may be counted only once in each cell. That is, in this case, this cell is handled as a "cell at which the hostile army unit has been defeated once". Also in this case, the positions at which the bonus cells are disposed can be dynamically changed.

In the above-described exemplary embodiment, for example, the positions of the bonus cells are set in the order starting from the "greatest" defeat number. In another exemplary embodiment, the positions of the bonus cells may be set in the order staring from the "smallest" defeat-number and being-defeated number. When this applies to a game in which, for example, the player's side army unit is assumed to be defeated many times, the position at which the player's side army unit is less likely to be defeated can be suggested to a player.

As to the effect to be set for the bonus cells, in the above-described exemplary embodiment, the effect content table 532 is changed according to the degree of the game progress. In another exemplary embodiment, the effect content (table in which the effects are defined) may be made different according to the defeat-number and the being-defeated number. For example, as the effect content table 532 for setting in a certain first bonus cell, the different effect content tables 532 may be prepared for the being-defeated number of 1000, the being-defeated number of 5000, and the being-defeated number of 10000, respectively. In this case, the effect content tables 532 may be set such that the greater the being-defeated number is, the more advantageous the effect to be exhibited is to the player. For example, the HP is restored 10 times when the being-defeated number is 1000, whereas the HP is restored 50 times when the being-defeated number is 10000.

In the above-described exemplary embodiment, as to the effect to be set in the bonus cell, the effect is selected at random from the plurality of effects defined in the effect content table 532. In another exemplary embodiment, in addition to the effect being selected at random, an effect may be exhibited by determination. For example, as to the effect to be exhibited for the first bonus cell, an effect of "obtaining an empirical value" may be set as a first effect to be exhibited by determination, and an effect which is selected at random as described above may be exhibited as a second effect different from the first effect. That is, two kinds of effects, that is, the first effect having fixed contents and the second effect which is randomly selected, may be exhibited.

Disposition of not only the bonus cells described above but also the other constituent elements of the play map may be changed based on the defeat number and the being-defeated number. For example, the position of a "treasure box" disposed on the play map may be randomly determined based on the defeat number and the being-defeated number. Furthermore, the disposition of the topography itself (that is, topographic structure itself of the play map) may be changed based on the defeat number and the being-defeated number. For example, the topography of the cells in which the being-defeated number is great may be changed to topography (that is, topography in which the unit is not easily defeated) in which the unit defense coefficient is increased, for example, changed from "plain" to "mountain".

In the above-described exemplary embodiment, the predetermined event is, for example, an event of "defeating the hostile army unit" and an event of the "player's side army unit being defeated". Other than this, for example, the following "events" may be counted. Firstly, the number of times an event of "using predetermined magic or skill" occurs may be counted for each cell. For example, the cell in which magic and/or skill for restoring the HP is used many times may be counted. In another example, a game may be structured such that a "trap" is set in a predetermined cell on the play map as described above, and a hostile army unit that has passed on the trap or has ended an action on the trap is damaged. The number of times the "trap" has operated is counted, and the positions at which the bonus cells are disposed may be determined based on the counted number of times.

A subject for performing the above-described process is not limited to the above-described one. For example, in the information processing system, a system on the server 101 side may be configured by a plurality of information processing devices, and the plurality of information processing devices may share a process to be performed on the server 101 side. Furthermore, a main process among a series of processes, as described above, to be performed by the information processing terminal 102 may be performed by a device of the server, and the information processing terminal 102 may perform a part of the processes. Furthermore, a so-called cloud gaming configuration may be adopted. For example, the information processing terminal 102 transmits, to the server 101, the operation data 511 representing an operation performed by a user, and the server 101 performs various game processing, and streaming distribution and transmission of the results of the processing to the information processing terminal 102 as a moving image and/or audio may be performed.

What is claimed is:

1. A computer-readable non-transitory storage medium having a game program stored therein, the game program causing a computer of an information processing apparatus to:

receive setting data via a network;

set, in a virtual field which is disposed in a virtual space and divided in a plurality of unit regions, at least one unit region defined based on the setting data having been received, as a special region associated with a special effect;

causing an image of the virtual space to be displayed;

perform game processing including at least a process of controlling movement of at least one player character in the image of the virtual space by using each unit region as a movement unit, based on an operation performed by a player, updating the virtual field in the virtual space, causing the player character to fight with a hostile character disposed in the virtual field, and exhibiting the special effect associated with the special region when the player character reaches the special region; and generate event occurrence information that includes information of the unit region in which an event has occurred in the game processing, and transmit the event occurrence information via the network at defined times, wherein the special region is set, based on a frequency with which the event occurs for each unit region, from the setting data which is generated according to the event occurrence information transmitted from a plurality of the information processing apparatuses and which includes statistical data that is data about the number of times the event occurs, or the special region is set based on the setting data which indicates the special region defined according to the statistical data that is data about the number of times the event occurs, where the number of times is based on event occurrence information of a plurality of information processing apparatuses.

2. The computer-readable non-transitory storage medium having stored therein the game program according to claim 1, wherein the event occurrence information includes information of a position of the unit region in which the player character has been disposed at occurrence of a being-defeated event in which the player character is defeated in the fight, and the unit region in which the being-defeated event occurs with high frequency is set as the special region.

3. The computer-readable non-transitory storage medium having stored therein the game program according to claim 2, wherein the game processing further includes a return process of returning, according to an instruction from the player, a state of the virtual field that includes the player character and the hostile character, to a state at a time before the instruction, and the event occurrence information includes information of a position of the unit region in which the being-defeated event occurs in a returned state, also when the return process has been performed.

4. The computer-readable non-transitory storage medium having stored therein the game program according to claim 2, wherein the game processing includes a process of consuming a parameter for fighting capability of the player character in the fight with the hostile character, and the special effect includes an effect of restoring the parameter of the player character after has been consumed when the player character reaches the special region.

5. The computer-readable non-transitory storage medium having stored therein the game program according to claim 1, wherein the event occurrence information includes information of the unit region in which the hostile character has been disposed at occurrence of a defeat event in which a hostile character is defeated in the fight.

6. The computer-readable non-transitory storage medium having stored therein the game program according to claim 1, wherein the special effect includes an effect of obtaining an item.

7. The computer-readable non-transitory storage medium having stored therein the game program according to claim 1, wherein the game processing is performed until a clearing condition is satisfied in the virtual field corresponding to a scene based on game progress, and the setting data associated with the scene and the virtual field is received when the game processing according to at least the scene is started, and wherein the defined times includes when the clearing condition is satisfied.

8. The computer-readable non-transitory storage medium having stored therein the game program according to claim 1, wherein the setting data includes data representing the number of times the event has occurred for each unit region, and the event occurrence information includes data representing the number of times obtained by adding the number of times of occurrence of the event for each unit region in the game processing to the number of times, of occurrence of the event for each unit region, which is included in the setting data obtained when the setting data is received.

9. The computer-readable non-transitory storage medium having stored therein the game program according to claim 8, wherein, when the number of times of occurrence of the event for each unit region exceeds a predetermined value, the number of times, of occurrence of the event in the unit region, which is included in the event occurrence information is reset and wherein the defined times includes when the event occurrence information is reset.

10. A game system comprising:
a plurality of information processing apparatuses; and
a server, wherein
each of the information processing apparatuses performs:
  obtaining setting data via a network from the server;
  setting, in a virtual field which is disposed in a virtual space and divided in a plurality of unit regions, at least one unit region defined based on the setting data having been received, as a special region associated with a special effect;
  displaying an image of the virtual space;
  game processing including at least a process of controlling movement of at least one player character in the image of the virtual space by using each unit region as a movement unit, based on an operation performed by a player, updating the virtual field in the virtual space, causing the player character to fight with a hostile character disposed in the virtual field, and exhibiting the special effect associated with the special region when the player character reaches the special region; and
  generating event occurrence information that includes information of the unit region in which an event has occurred in the game processing, and transmitting the event occurrence information via the network to the server at defined times, and the server generates the setting data that includes statistical data that is data about the number of times the event occurs, according to the event occurrence information transmitted from the plurality of information processing apparatuses, and the special region is set based on the statistical data by each information processing apparatus, or the server generates the setting data that includes the statistical data, according to the event occurrence information transmitted from the plurality of information processing apparatuses, and generates the setting data which indicates the special region based on a frequency with which the event occurs for each unit region.

11. The game system according to claim 10, wherein
the event occurrence information includes information of a position of the unit region in which the player character has been disposed at occurrence of a being-defeated event in which the player character is defeated in the fight, and
the unit region in which the being-defeated event occurs with high frequency is set as the special region in the special region setting process.

12. The game system according to claim 11, wherein
the game processing further includes a return process of returning, according to an instruction from the player, a state of the virtual field that includes the player character and the hostile character, to a state at a time before the instruction, and
the event occurrence information includes information of a position of the unit region in which the being-defeated event occurs in a returned state, also when the return process has been performed.

13. The game system according to claim 11, wherein
the game processing includes a process of consuming a parameter for fighting capability of the player character in the fight with the hostile character, and
the special effect includes an effect of restoring the parameter, for the fighting capability, of the player character that has reached the special region when the parameter has been consumed.

14. The game system according to claim 10, wherein the event occurrence information includes information of the unit region in which the hostile character has been disposed at occurrence of a defeat event in which a hostile character is defeated in the fight.

15. The game system according to claim 10, wherein the special effect includes an effect of obtaining an item.

16. The game system according to claim 10, wherein
the game processing is performed until a clearing condition is satisfied in the virtual field corresponding to a scene based on game progress, and
the setting data associated with the scene and the virtual field is received when the game processing according to at least the scene is started, and
wherein the defined times includes when the clearing condition is satisfied.

17. The game system according to claim 10, wherein
the setting data includes data representing the number of times the event has occurred for each unit region, and
the event occurrence information includes data representing the number of times obtained by adding the number of times of occurrence of the event for each unit region in the game processing to the number of times, of occurrence of the event for each unit region, which is included in the setting data obtained.

18. The game system according to claim 17, wherein, when the number of times of occurrence of the event for each unit region exceeds a predetermined value, the number of times, of occurrence of the event in the unit region, which is included in the event occurrence information is reset and wherein the defined times includes when the event occurrence information is reset.

19. The computer-readable non-transitory storage medium having stored therein the game program according to claim 1, wherein the special region is displayed with a visual effect different from the other regions.

20. The computer-readable non-transitory storage medium having stored therein the game program according to claim 1, wherein the special effect is based on game progress.

21. The computer-readable non-transitory storage medium having stored therein the game program according to claim 1, wherein once the player reaches the special region and the special effect associated with the special region is exhibited by the player character in the game processing, resetting the special region such that the special region is not associated with the special effect.

22. The computer-readable non-transitory storage medium having stored therein the game program according to claim 1, when the setting data is received from a server at defined times of game progress.

23. The computer-readable non-transitory storage medium having stored therein the game program according to claim 1, wherein the special effect is based on the type of event used to generate the event occurrence information used to set the special region.

24. The computer-readable non-transitory storage medium having stored therein the game program according to claim 23, wherein the special region comprises a first special region and a second special region, where the first special region is set based on a being-defeated event with high frequency and the second special region is set based on a defeated event in which the hostile character is defeated in the fight at a high frequency.

25. The computer-readable non-transitory storage medium having stored therein the game program according to claim 23, wherein the first special region has a first special effect and the second special region has a second special effect, where the first special effect is different from the second special effect.

26. A game apparatus comprising:
a processor configured to obtain setting data via a network;
set, in a virtual field which is disposed in a virtual space and divided in a plurality of unit regions, at least one unit region defined based on the setting data having been received, as a special region associated with special effect;
display an image of the virtual space;
game processing including at least a process of controlling movement of at least one player character in the image of the virtual space by using each unit region as a movement unit, based on an operation performed by a player, updating the virtual field in the virtual space, causing the player character to fight with a hostile character disposed in the virtual field, and exhibiting the special effect associated with the special region when the player character reaches the special region; and
generate event occurrence information that includes information of the unit region in which a event has occurred in the game processing, and transmit the event occurrence information via the network at a defined times, and
the special region is set, based on a frequency with which the event occurs for each unit region, from the setting data which is generated according to the event occurrence information transmitted from a plurality of the information processing apparatuses and which includes statistical data that is data about the number of times the event occurs, or
the special region is set based on the setting data which indicates the special region defined according to the statistical data that is data about the number of times the event occurs, where the number of times is based on event occurrence information of a plurality of information processing apparatuses.

27. A game processing method for controlling a computer of an information processing system that includes a server and a plurality of information processing apparatuses, the method causing a computer of each information processing apparatus to execute:

receive setting data via a network from the server;

set, in a virtual field which is disposed in a virtual space and divided in a plurality of unit regions, at least one unit region defined based on the setting data having been received, as a special region associated with a special effect;

cause an image of the virtual space to be displayed;

perform game processing including at least a process of controlling movement of at least one player character in the image of the virtual space by using each unit region as a movement unit, based on an operation performed by a player, updating the virtual field in the virtual space, causing the player character to fight with a hostile character disposed in the virtual field, and exhibiting the special effect associated with the special region when the player character reaches the special region; and generate event occurrence information that includes information of the unit region in which an event has occurred in the game processing, and transmit the event occurrence information via the network to the server at defined times, wherein the setting data includes statistical data that is data about the number of times the event occurs, according to the event occurrence information transmitted from the plurality of information processing apparatuses, and the special region is set based on the statistical data in each information processing apparatus, or the setting data indicates the special region, the special region determined based on the statistical data that is data about the number of times the event occurs, where the number of times is based on event occurrence information of a plurality of information processing apparatuses.

\* \* \* \* \*